United States Patent
Ishii et al.

(10) Patent No.: US 10,585,691 B2
(45) Date of Patent: Mar. 10, 2020

(54) DISTRIBUTION SYSTEM, COMPUTER, AND ARRANGEMENT METHOD FOR VIRTUAL MACHINE

(71) Applicant: Hitachi, Ltd., Chiyoda-ku, Tokyo (JP)

(72) Inventors: Yohsuke Ishii, Tokyo (JP); Takuya Oda, Tokyo (JP); Hiromu Hota, Tokyo (JP); Nobuaki Kohinata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 189 days.

(21) Appl. No.: 15/500,140

(22) PCT Filed: Oct. 30, 2014

(86) PCT No.: PCT/JP2014/078972
§ 371 (c)(1),
(2) Date: Jan. 30, 2017

(87) PCT Pub. No.: WO2016/067424
PCT Pub. Date: May 6, 2016

(65) Prior Publication Data
US 2017/0277556 A1    Sep. 28, 2017

(51) Int. Cl.
*G06F 9/455* (2018.01)
*G06F 16/178* (2019.01)
(Continued)

(52) U.S. Cl.
CPC ............ *G06F 9/45558* (2013.01); *G06F 9/46* (2013.01); *G06F 9/50* (2013.01); *G06F 9/5038* (2013.01);
(Continued)

(58) Field of Classification Search
CPC .......... G06F 9/45558; G06F 9/46; G06F 9/50; G06F 9/5038; G06F 17/30174;
(Continued)

(56) References Cited

U.S. PATENT DOCUMENTS 8,732,118 B1 *  5/2014  Cole ................. G06F 17/30563
                                                    707/600
9,020,891 B1 *  4/2015  Stefani ..................... G06F 8/65
                                                    707/636
(Continued)

OTHER PUBLICATIONS

International Search Report (PCT/ISA/210) issued in PCT Application No. PCT/JP2014/078972 dated Dec. 2, 2014 with English-language translation (two (2) pages).
(Continued)

*Primary Examiner* — Jacob D Dascomb
(74) *Attorney, Agent, or Firm* — Crowell & Moring LLP

(57) ABSTRACT

In a distribution system including a plurality of physical machines, when an output file output by first processing performs multistage processing input to second processing, a physical machine which is a deployment destination of a first virtual machine for performing the first processing, a physical machine which is a storage destination of each data block included in the output file, and a physical machine which is a deployment destination of a second virtual machine for performing the second processing are determined based on relationship between the first and second processing.

10 Claims, 16 Drawing Sheets

(51) Int. Cl.
*G06F 16/182* (2019.01)
*G06F 9/50* (2006.01)
*G06F 9/46* (2006.01)

(52) U.S. Cl.
CPC ........ *G06F 16/178* (2019.01); *G06F 16/1844* (2019.01); *G06F 2009/4557* (2013.01); *G06F 2009/45583* (2013.01)

(58) Field of Classification Search
CPC ....... G06F 17/30215; G06F 2009/4557; G06F 2009/45583; G06F 16/30174; G06F 16/30215
See application file for complete search history.

(56) References Cited

U.S. PATENT DOCUMENTS

| | | | |
|---|---|---|---|
| 2013/0219068 A1* | 8/2013 | Ballani | G06F 9/5061 709/226 |
| 2013/0318525 A1 | 11/2013 | Palanisamy et al. | |
| 2014/0059310 A1 | 2/2014 | Du et al. | |
| 2014/0380320 A1* | 12/2014 | Lin | G06F 9/4881 718/102 |

OTHER PUBLICATIONS

Japanese-language Written Opinion (PCT/ISA/237) issued in PCT Application No. PCT/JP2014/078972 dated Dec. 2, 2014 (three (3) pages).

* cited by examiner

FIG. 4

Data set information table — 1000

| Data set ID | Data source ID | Root directory | Primary data storage node | Primary data storage method | Secondary data storage node | Secondary data storage method |
|---|---|---|---|---|---|---|
| 101 | IP 10.20.1.1 (Client-PC) | /data | Node1, Node3 | Local access value ≥ 50% and integrated storage | Other than primary data storage node | Distributed storage |
| 102 | PG1-1 | /result | Node1 | Local access value = 100% and integrated storage | Other than primary data storage node | Distributed storage |
| 103 | PG1-2 | /BI-root | None | None | All nodes | Distributed storage |

Data processing information table 1200

| Process-ing group ID 1210 | Priority 1220 | Sequen-ce number 1230 | Program 1240 | Execution trigger 1250 | Number of virtual machines 1260 | Number of CPUs 1261 | Memo-ry capa-city 1262 | Disk type 1263 | Disk capacity 1264 | Network band-width 1265 | INPUT data set ID 1270 | INPUT data narrow-ing condition 1271 | INPUT local access value 1272 | OUTPUT data set ID 1280 | OUTPUT local access value 1281 |
|---|---|---|---|---|---|---|---|---|---|---|---|---|---|---|---|
| PG1 | 10 | 1 | -Hadoop2 -Spark/Shark | 5AM everyday | 2 | 4 | 8GB | HDD | 1TB | 1Gbps | 101 | ALL | 50 | 102 | Free |
| PG1 | 10 | 2 | -PaaS -Runtime -BI | ALL | 1 | 2 | 8GB | HDD | 1TB | 1Gbps | 102 | ALL | 100 | 103 | Free |

Physical resource information table — 1300

| Node group ID | Node ID | CPU resource | | | Memory resource | | Disk resource | | | Network resource | | | ... |
|---|---|---|---|---|---|---|---|---|---|---|---|---|---|
| | | 1331 Specs | 1332 Sum total | 1333 Alloca-tion rate | 1341 Sum total | 1342 Alloca-tion rate | 1351 Specs | 1352 Sum total | 1353 Alloca-tion rate | 1361 Specs | 1362 Sum total | 1363 Alloca-tion rate | |
| NG1 | Node1 | 1.5GHz | 10 | 50% | 32GB | 50% | SATA | 1TB | 80% | Ethernet | 10Gbps | 50% | |
| NG1 | Node2 | 1.5GHz | 10 | 40% | 32GB | 40% | SATA | 1TB | 60% | Ethernet | 10Gbps | 40% | |
| NG1 | Node3 | 1.5GHz | 10 | 40% | 32GB | 40% | SATA | 1TB | 60% | Ethernet | 10Gbps | 40% | |
| NG1 | Node4 | 1.5GHz | 10 | 40% | 32GB | 40% | SATA | 1TB | 60% | Ethernet | 10Gbps | 40% | |

Virtual machine information table — 1400

| Virtual machine ID (1410) | Node ID (1420) | Number of CPUs (1430) | Memory capacity (1440) | Disk capacity (1450) | Network bandwidth (1460) | Use state (1470) |
|---|---|---|---|---|---|---|
| VM1 | Node1 | 4 | 8GB | 1TB | 1Gbps | PG1 |
| VM2 | Node2 | 4 | 8GB | 1TB | 1Gbps | PG1 |
| VM3 | Node1 | 2 | 8GB | 1TB | 1Gbps | PG1 |

Data block storage information table — 1500

| Data block ID (1510) | File ID (1520) | File offset (1530) | Data set ID (1540) | Number of stored data (1550) | Storage place (1560) | |
|---|---|---|---|---|---|---|
| b11 | f1 | 0 | 101 | 2 | Node1: /data/b11 | ... |
| b12 | f1 | 64K | 101 | 2 | Node1: /data/b12 | ... |
| b21 | f2 | 0 | 101 | 2 | Node3: /data/b21 | ... |
| b22 | f2 | 64K | 101 | 2 | Node3: /data/b22 | ... |
| b31 | f3 | 0 | 101 | 2 | Node2: /data/b31 | ... |
| b32 | f3 | 64K | 101 | 2 | Node2: /data/b32 | ... |
| b41 | f4 | 0 | 101 | 2 | Node4: /data/b41 | ... |
| b42 | f4 | 64K | 101 | 2 | Node4: /data/b42 | ... |
| b51 | f5 | 0 | 102 | 2 | Node1: /result/b51 | ... |
| b61 | f6 | 0 | 102 | 2 | Node1: /result/b61 | ... |
| b71 | f7 | 0 | 103 | 2 | Node2: /Bl-root/b71 | ... |

1501a

DISTRIBUTION SYSTEM, COMPUTER, AND ARRANGEMENT METHOD FOR VIRTUAL MACHINE

TECHNICAL FIELD

The present invention generally relates to a technique of a distribution system, a computer and an arrangement method for a virtual machine.

BACKGROUND ART

A technique has been known in which a distributed file system for using the Hadoop and a plurality of virtual machines are constructed in a distribution system and distributed processing is performed to large-scale data. In the distributed file system, clustering is performed to a plurality of physical machines. PTL 1 discloses a technique for preventing that the replica data in a hadoop distributed file system (HDFS) is stored in one physical machine and a technique for making the replica data stored in the local physical machine preferentially read.

CITATION LIST

Patent Literature

[PTL 1] US 2014/0059310 A

SUMMARY OF INVENTION

Technical Problem

A single file in the HDFS is divided into one or two or more data blocks. A plurality of data blocks included in a plurality of files is distributed to and stored in a plurality of physical machines. Two or more data blocks included in the single file may be distributed to two or more physical machines. Therefore, when performing predetermined processing, a virtual machine for operating in the physical machine may collect the data blocks (including replica data) from a remote physical machine via the HDFS and configure an input file to be used for the processing.

Since the data block is collected via a communication network (referred to as "network" below), the processing to configure the file from the data block increases a load relative to a network bandwidth. In addition, to obtain the data block from the remote physical machine via the network makes a response time longer than to obtain the data block from a local physical machine.

A purpose of the present invention is to provide a distribution system and an arrangement method for a physical machine and a virtual machine to reduce a load relative to a network bandwidth. Also, another purpose of the present invention is to provide a distribution system and an arrangement method for a physical machine and a virtual machine which increases a possibility that the data block of the local physical machine is accessed.

Solution to Problem

A distribution system according to one embodiment of the present invention distributes and stores a plurality of data blocks included in a plurality of files. The distribution system includes a plurality of physical machines connected to a communication network and for performing a plurality of virtual machines and a management machine connected to at least one of the plurality of physical machines.

A target machine which is at least one of the plurality of physical machines and management machines determines a physical machine which is an arrangement destination of a first virtual machine for performing first processing, one or more physical machines which becomes a storage destination of one or more data block included in an output file, and a physical machine which is an arrangement destination of a second virtual machine for performing second processing based on relationship between the first processing and second processing in multistage processing including the first processing and second processing having the output file output according to the first processing as an input.

Advantageous Effects of Invention

According to the present invention, a load applied to a network bandwidth can be reduced in a distribution system. Also, according to the present invention, a possibility that a data block of a local physical machine is accessed can be increased in the distribution system.

BRIEF DESCRIPTION OF DRAWINGS

FIG. 4 is a diagram of an exemplary structure of a data set information table.

FIG. 5 is a diagram of an exemplary structure of a data processing information table.

FIG. 6 is a diagram of an exemplary structure of a physical resource information table.

FIG. 7 is a diagram of an exemplary structure of a virtual machine information table.

FIG. 8 is a diagram of an exemplary structure of a data block storage information table.

DESCRIPTION OF EMBODIMENTS

An embodiment will be described below. In the following description, information may be described by an expression of "xxx table" or "xxx list". However, the information may be expressed by any data structures. That is, in order to indicate that the information does not depend on the data structure, "xxx table" or "xxx list" may be referred to as "xxx information".

Also, in the following description, there is a case where processing is described by using "xxx unit" as a subject.

However, "xxx unit" may be one kind of a computer program (referred to as "program"). The program is performed by a processor (for example, a central processing unit (CPU)) so that determined processing is performed while appropriately using at least one of a storage resource (for example, memory) and a network interface device. Therefore, the subject of the processing may be the processor or an apparatus including the processor. A part of or all of the processing performed by the processor may be performed by a hardware circuit (for example, an application specific integrated circuit (ASIC)). The program may be installed from a program source. The program source may be a program distribution server or a storage media (for example, a portable storage media). Also, the processor and the memory may be collectively referred to as a controller.

Also, in the description below, when the same kinds of elements are distinguished from each other and described, reference symbols such as "node 111a" and "node 111b" are used. When the same kinds of elements are described without being distinguished from each other, a common number in the reference symbol such as "node 111" is used.

Figure 1:
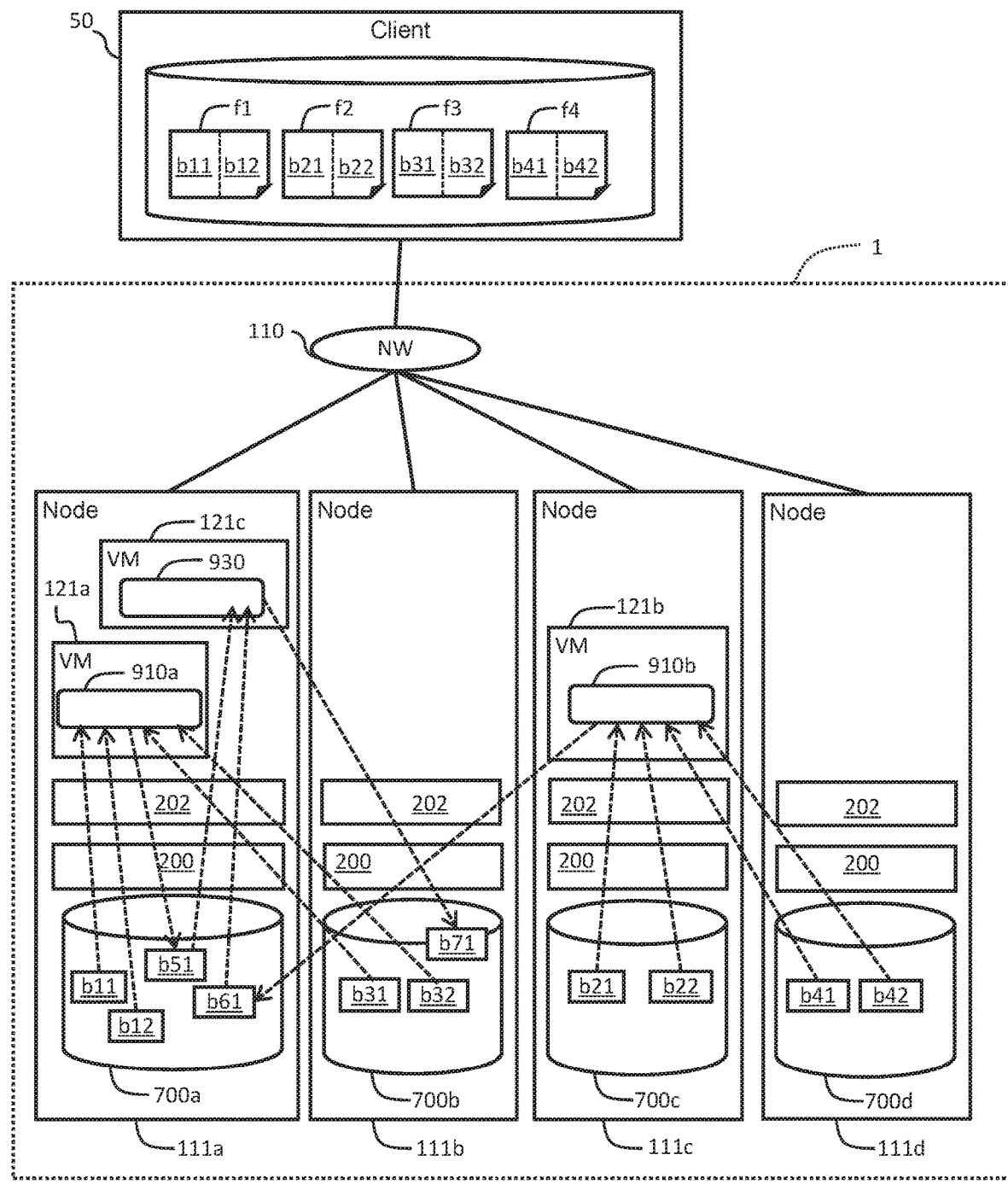
FIG. 1 is a diagram of an outline of an operation of a distribution system according to the present embodiment.

FIG. 1 is a diagram of an outline of an operation of a distribution system 1 according to the present embodiment.

Nodes 111a, 111b, 111c, and 111d can transmit/receive data to/from each other via a network 110. A system including the nodes 111a, 111b, 111c, and 111d and the network 110 is referred to as the distribution system 1. The node 111 is a physical machine which is a kind of an electronic computer. In the following description, when the subject of the processing is "distribution system 1", one or two or more nodes 111 may perform the processing in a coordinated manner.

A client 50 which is a kind of the electronic computer requests analysis processing of data to be analyzed relative to the distribution system 1. The distribution system 1 performs the analysis processing by executing analysis softwares 910a and 910b. The distribution system 1 executes a business intelligence (BI) software 930 and refers to and uses the analysis result by the analysis softwares 910a and 910b. That is, an output data (analysis result) of the analysis softwares 910a and 910b which is processing at a first stage (former stage) is an input data of the BI software 930 which is processing at a second stage (latter stage). In this way, to process the data to be analyzed by dividing into a plurality of stages is referred to as "multistage processing".

The multistage processing includes a plurality of processing including a plurality of stages. The multistage processing has at least one processing set including first processing (former stage processing) and second processing (latter stage processing) having a file output by the first processing as an input. In the multistage processing, start point processing (processing as a start point) is the first processing, and end point processing (processing as an end point) is the second processing. Processing between the start point processing and the end point processing is both the first and second processing. The multistage processing may be a plurality of cascade-shaped (tree-shaped) processing and recursive processing (processing which ends in a case where a result of certain processing has satisfied a predetermined condition).

Next, FIG. 1 will be described. The analysis software 910a has a file f1 (data blocks b11 and b12) and a file f3 (data blocks b31 and b32) as an input data and includes a function to output a file f5 (data block b51) as the analysis result of them.

The analysis software 910b has a file f2 (data blocks b21 and b22) and a file f4 (data blocks b41 and b42) as an input data and includes a function to output a file f6 (data block b61) as the analysis result of them.

The BI software 930 has the f5 (data block b51) which is the analysis result by the analysis software 910a and the file f6 (data block b61) which is the analysis result by the analysis software 910b as an input data and includes a function to output a file f7 (data block b71) as the analysis result of them.

The client 50 requests the analysis processing of information included in the files f1, f2, f3, and f4 relative to the distribution system 1 (certain node 111 thereof).

The distribution system 1 (certain node 111 hereinafter) divides each files f1 to f4 requested by the client 50 into one or two or more data blocks. That is, the distribution system divides the file f1 into the data blocks b11 and b12, divides the file f2 into the data blocks b21 and b22. Also, the distribution system divides the file f3 into the data blocks b31 and b32 and divides the file f4 into the data blocks b41 and b42.

Here, it is important that in which node (storage apparatus 700 of the node hereinbelow) these divided data blocks b11, b12, b21, and . . . are stored and which node 111 performs these softwares 910a, 01b, and 930. The reason is as follows.

It is necessary for the node to reconstruct the input file of the software executed in the node from the plurality of data blocks. At this time, it is necessary for the node to obtain a data block stored in the other node (that is, remote node) via the network 110. However, as described above, acquisition of the data block from the remote node via the network 110 takes longer time than acquisition of the data block from the node (that is, local node). In addition, the acquisition of the data block from the remote node increases the load relative to the network bandwidth.

The distribution system 1 allows the plurality of data blocks included in the input file of the software and the software exist in a single node as possible. That is, the distribution system 1 does not randomly store the plurality of data blocks included in the input file in each node and store the plurality of data blocks in one node as many as possible. Also, according to the distribution system 1, the node in which a number of data blocks are stored executes the software regarding the input file. For example, when the virtual machine 121 constructed in a hypervisor 202 executes the software, the distribution system 1 arranges the virtual machine 121 in the node 111 in which a number of data blocks are stored.

Here, a value regarding a percentage of the data blocks stored in the local node for executing the software of the plurality of data blocks input in the software is referred to as "local access value".

When a condition has been configured that the local access value of the analysis software 910a is configured to be equal to or larger than 50%, the distribution system 1 may store the file f1 (data blocks b11 and b12) and the f3 (data blocks b31 and b32) input by the client 50 in each node so that the local access value of the analysis software 910a becomes equal to or larger than 50%. The distribution system 1 may store the data blocks b11 and b12 in the node 111g in which the analysis software 910a is executed.

When a condition has been configured that a local access value of the BI software 930 is configured to be equal to or larger than 90%, the distribution system 1 may store the files f5 (data block b51) and f6 (data block b61) respectively output from the analysis softwares 910a and 910b in each node so that the local access value of the BI software 930 becomes equal to or larger than 90%.

The distribution system 1 may control a distributed file system 200 to store equal to or larger than 90% of the data blocks b51 and b61 input to the BI software 930 in the single node. The distribution system 1 may arrange the BI software 930 (virtual machine 121c) in the node where equal to or larger than 90% of data blocks b51 and b61 are stored.

The distribution system 1 may previously determine a place to arrange the BI software 930 (virtual machine 121c). The distribution system 1 may control the distributed file system 200 to store equal to or larger than 90% of the data blocks b51 and b61 input to the BI software 930 in the local node in which the BI software 930 is executed.

The distribution system 1 may manage "data set information" including configuring information on a data set (file group) regarding the input/output of each processing included in the multistage processing. The distribution system 1 may correspond a piece of the data processing information to a piece of the data set information. The data set information may include a condition regarding the storage of the data set (for example, local access value).

The distribution system 1 may manage "data processing information" including an order of processing included in the multistage processing, a processing content, and the configuring information on the input/output data of each processing. The distribution system 1 may correspond a piece of the data processing information to one software. The data processing information may include an order of the processing in the multistage processing, the software for executing the processing, specs of the virtual machine necessary for the execution of the software, and the data set information regarding the input/output of the processing.

The distribution system 1 may execute the software included in the data processing information by a node group based on data set information corresponding to the above-mentioned data processing information. The distribution system 1 may select a node in which the data block is stored so as to increase the local access value.

The distribution system 1 may store the plurality of data blocks divided from one file in a single node as possible. For example, in FIG. 1, the distribution system 1 stores the data blocks b11 and b12 divided from the file f1 in the node 111a (storage apparatus 700a) and stores the data blocks b21 and b22 divided from the file f2 in the node 111c (storage apparatus 700c).

The distribution system 1 may store the plurality of data blocks output according to the processing at the first stage in a single node as possible. For example, in FIG. 1, the distribution system 1 stores the data blocks b51 and b61 respectively output from the analysis softwares 910a and 910b in the single node 111a (storage apparatus 700a).

The distribution system 1 according to the present embodiment stores the plurality of data blocks to be analyzed in an appropriate node based on the data processing information and the data set information which have been previously configured. Also, the distribution system 1 can perform the provisioning of the virtual machine for executing the software regarding the analysis processing to the appropriate node.

Figure 2:
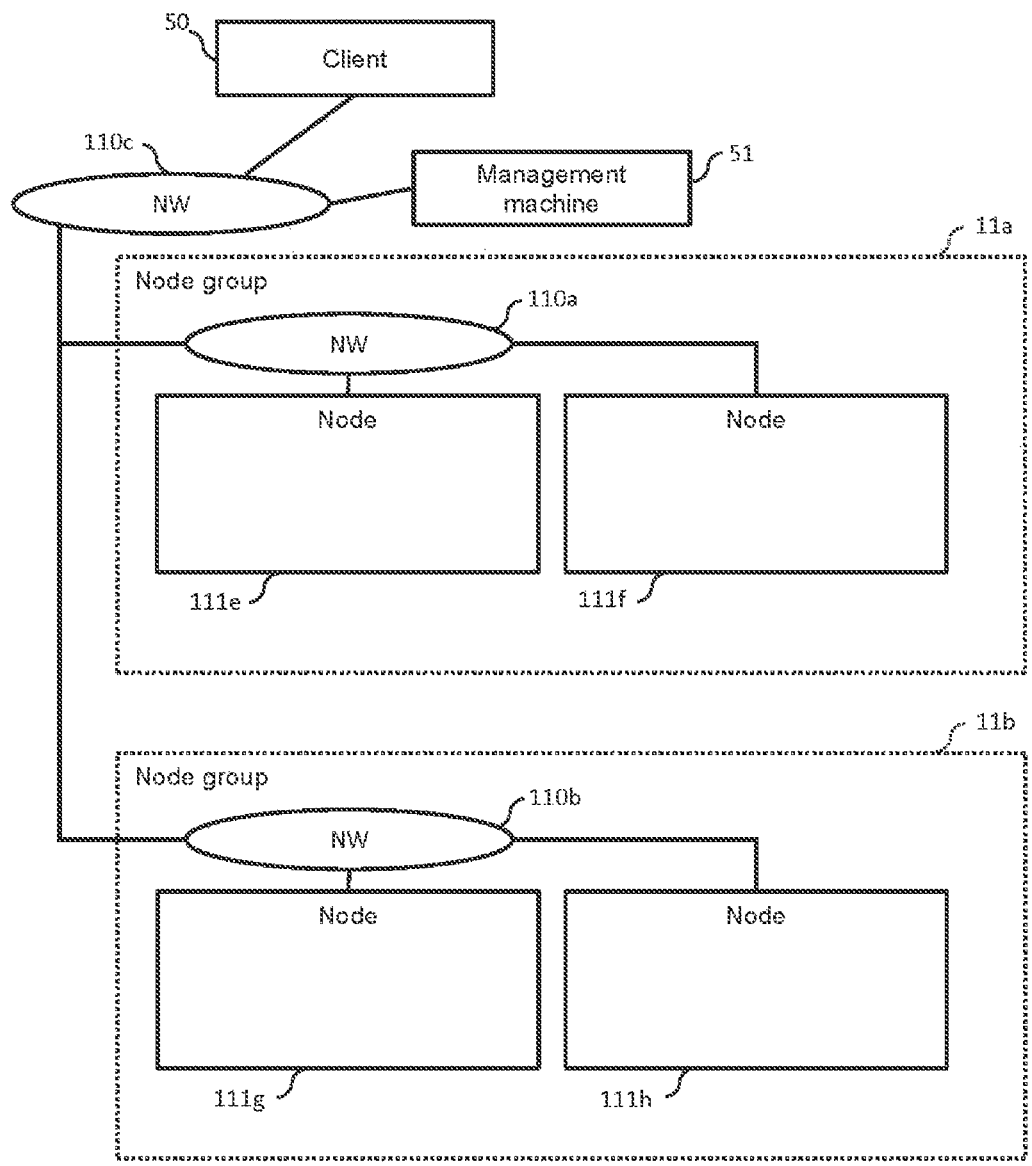
FIG. 2 is a diagram of an exemplary structure of a distribution system.

FIG. 2 is a modification of the distribution system.

The distribution system is not limited to the structure in FIG. 1 and may include multistage network. For example, as illustrated in FIG. 2, node 111e and 111f are connected to a network 110a and node 111g and 111h are connected to a network 110b. The node 111e and 110f (or 110g and 110h) connected to the same network 110a (or 110b) is referred to as a node group 11a (or 11b). The networks 110a and 110b are connected to an upstream network 110c. The nodes 110e to 110h can transmit/receive the data to/from each other via the networks 110a, 110b, and 110c.

The distribution system may include a management machine 51 to manage the distribution system. The management machine 51 may include one or more computers. Specifically, for example, when a management computer displays information (specifically, when the management computer displays information on a display device thereof or when the management computer transmits the information to be displayed to a remote display computer), the management computer is the management machine 51. Also, for example, when a function similar to that of the management computer is realized by a plurality of computers, the plurality of computers (may include the display computer when the information is displayed by the display computer) is the management machine 51.

The distribution system may include the client 50 for using the distribution system. The management machine 51 or the client 50 may be a certain node 111 in the distribution system or one virtual machine 121.

A plurality of nodes is included in a single node group in FIG. 2. However, the node group is not limited to this structure. For example, a plurality of node groups may be included in another node group. In this way, the administrator can flexibly manage the distribution system by a unit of the node group with multistage node group.

Figure 3:
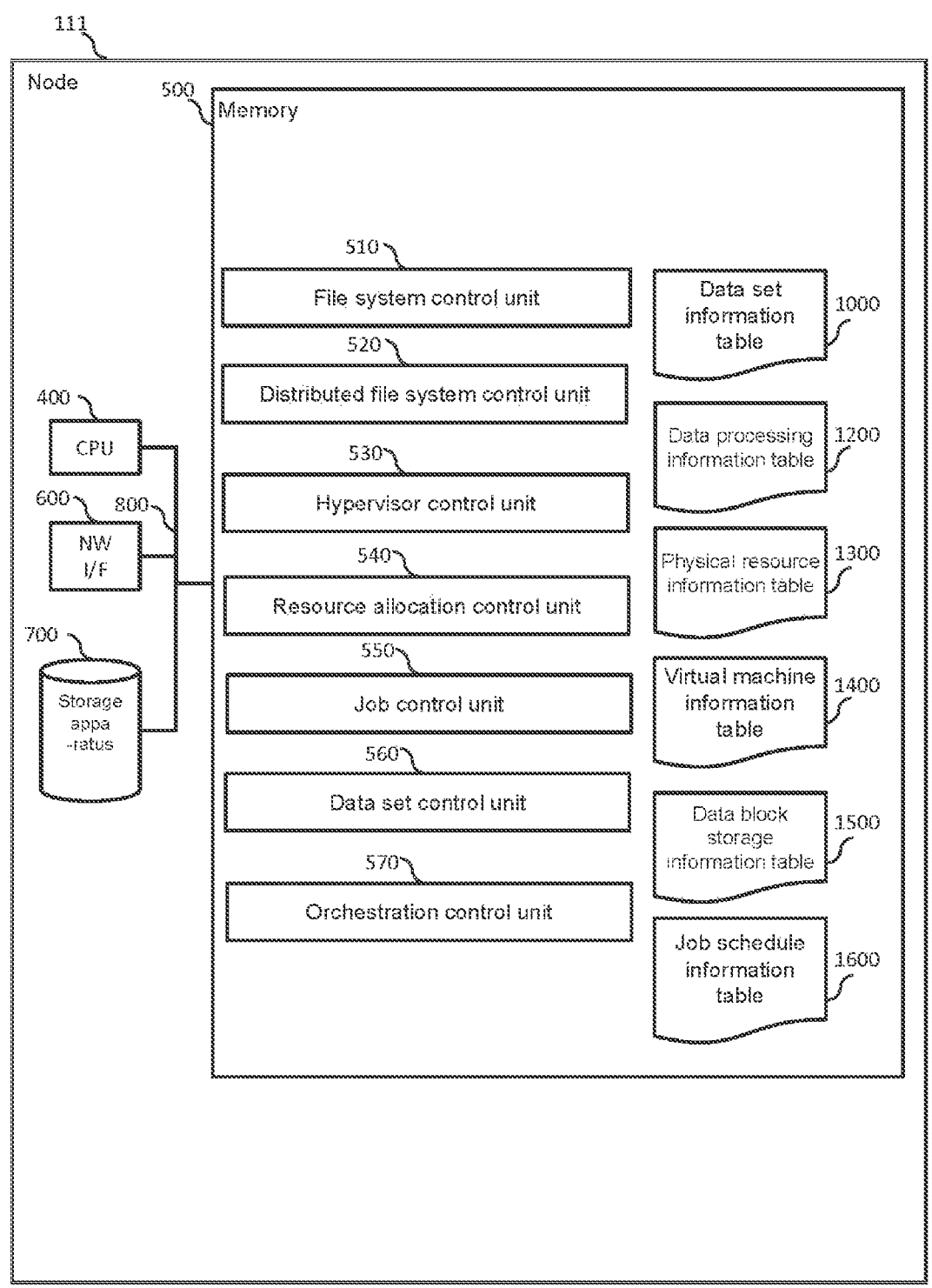
FIG. 3 is an exemplary structure of a node.

FIG. 3 is an exemplary structure of the node 111. The structure illustrated in FIG. 3 is an example. For example, one component (for example, xxx unit or xxx table) may be divided into a plurality of components, and a plurality of components may be integrated into a single component.

The node 111 includes a CPU 400, a memory 500, a network I/F 600, and a storage apparatus 700. These elements are connected via a bus 800 which can bidirectionally transmit/receive the data. An example of the bus 800 is a PCI express (PCIe). The storage apparatus 700 may be provided inside/outside the node 111.

The data block is stored in the storage apparatus 700. The storage apparatus 700 writes, reads, copies, migrates, and deletes the data block according to a predetermined command. An example of the storage apparatus 700 is a hard disk drive (HDD), a solid state drive (SSD), and a flash memory.

The network interface (I/F) 600 connects the node 111 to the network 110. An example of the network I/F 600 is a fiber channel adapter and a network interface card (NIC).

The CPU 400 executes a computer program stored in the memory 500 and realizes various functions to be described in the present embodiment.

The memory 500 stores the computer program, the data, and the like accessed by the CPU 400, the network I/F 600, the storage apparatus 700, and the like. An example of the memory 500 is a dynamite random access memory (DRAM), a magnetic random access memory (MRAM), and a ferroelectric random access memory (FeRAM).

A file system control unit 510, a distributed file system control unit 520, a hypervisor control unit 530, a resource allocation control unit 540, a job control unit 550, a data set control unit 560, and an orchestration control unit 570 are stored in the memory 500 as a kind of the computer program. In addition, a data set information table 1000, a data processing information table 1200, a physical resource information table 1300, a virtual machine information table 1400, a data block storage information table 1500, and a job schedule information table 1600 are stored in the memory 500 as a kind of the information. These tables will be described below in detail.

The file system control unit 510 controls a file system regarding the storage apparatus 700 of the local node 111. That is, the file system control unit 510 can access to the data stored in the storage apparatus 700 through the file system. An example of the file system is a FAT, an NTFS, and an ext3.

The distributed file system control unit 520 controls the distributed file system 200 (refer to FIG. 1) regarding the distribution system 1. That is, the distributed file system control unit 520 can seamlessly access to the data stored in the storage apparatus 700 of one node 111 included in the distribution system 1 via the distributed file system 200. The node 111 may be local and remote. The distributed file system control unit 520 realizes the distributed file system 200 by cooperating with the file system control unit 510 of the remote node. According to this, the virtual machine 121, the software, and the like can access to the data via the distributed file system 200 without concerning which node 111 stores the data to be accessed. Also, by applying the distributed file system 200 to the distribution system 1, the distribution system 1 can flexibly add and delete the nodes. An example of the distributed file system 200 is an HDFS.

The distributed file system control unit 520 may generate replica data obtained by replicating the data block as necessary and store it in another node. This is to make the data block redundant and increase availability of the distribution system 1.

The hypervisor control unit 530 controls the hypervisor 202 (refer to FIG. 1) included in the node 111. The hypervisor 202 provides an environment to execute the virtual machine 121. Also, the hypervisor 202 appropriately adjusts a connection between the physical resource included in the node 111 (physical machine) and the virtual resource allocated to the virtual machine 121. An example of the hypervisor 202 is a kernel-based virtual machine (KVM).

The hypervisor control unit 530 controls the virtual machine 121 in the node 111 through the control of the hypervisor 202. The hypervisor control unit 530 may start, stop and restart the virtual machine 121. Also, the hypervisor control unit 530 may migrate the virtual machine 121 between the nodes.

The resource allocation control unit 540 allocates the physical resource included in the node 11 to the virtual machine 121. For example, the hypervisor control unit 530 controls the virtual machine 121 and an amount of the resource to which the physical resource included in the node 111 (calculation resource, memory resource, network resource, and the like) is allocated (allocated). For example, the resource allocation control unit 540 preliminarily secures the physical resource allocated to the virtual machine 121. This is to prevent the physical resource allocated to a certain virtual machine from being arbitrarily intercepted by other virtual machine.

The job control unit 550 controls a job executed by the node 111. The job control unit 550 may control the job based on a schedule. An example of a job content is backup and migration of the data regarding the distributed file system 200, to create, restart, delete, and migrate the virtual machine regarding the hypervisor 202, to start and stop various software performed by the virtual machine, to start and stop batch-type processing which is regularly performed, and to start and stop interactive processing which is appropriately performed.

The data set control unit 560 controls the data set information table 1000. The data set information includes configuring information (definition information) to group the plurality of data blocks as a single data set. The data set information may include the configuring information (definition information) such as a storage place and storage method for the data set. By corresponding "data set" to "processing", it becomes easy to store the plurality of data blocks included in the "data set" in the single node. To collectively store the plurality of data blocks in the single node may reduce processing, which may be necessary when the file is reconstructed, for obtaining the data block from the remote node 111. That is, a load relative to the network bandwidth between the nodes may be reduced.

The orchestration control unit 570 controls the multistage processing and distribution processing performed in the distribution system 1.

The orchestration control unit 570 allows the processing performed by the node 111 to access to the data block so as to satisfy a predetermined condition as possible. For example, the orchestration control unit 570 controls the arrangement of virtual machine 121 for performing the processing and/or the data blocks used in the processing so that the processing performed by the node 111 can access the local data block at a ratio equal to or larger than the local access value. The orchestration control unit 570 may perform the control while cooperating with the control units 510, 520, 530, 540, 550, and 560 by using the information in the tables 1000, 1200, 1300, 1400, 1500, and 1600.

The orchestration control unit 570 may include a following function in the multistage processing in which one or two or more files output by one or two or more first processing (referred to as "output file") are used to input of one or two or more second processing.

The orchestration control unit 570 may determine a node where a first virtual machine for performing the first processing is arranged, one or more node 111 where one or more data blocks included in the output file is stored (storage apparatus 700 hereinafter), and a node 111 where a second virtual machine for performing the second processing is arranged based on the relationship between the first and second processing.

The relationship between the first and second processing may be to satisfy the local access value requested by the second processing. Here, the local access value may be a value regarding the percentage of the data blocks stored in the node 111 where the second virtual machine is arranged of the plurality of data blocks included in the output file to be input to the second processing. According to this, the second processing can access to the data block of the local node 111 at a rate equal to or larger than the local access value. That is, the load relative to the network bandwidth between the nodes can be reduced, and at the same time, an execution speed of the second processing can be improved. The local access value will be described in detail below.

When the orchestration control unit 570 cannot determine a place where the first and second virtual machines are arranged and a place to store each data block included in the output file of the first processing so as to satisfy the local access value requested by the second processing, the orchestration control unit 570 may store the replica data in the node where the second virtual machine is arranged. The replica data is a replica of a part of data block included in the output file. At this time, in a case where the local access value requested by the second processing cannot be satisfied when equal to or larger than a predetermined number of the replica data is not created, the orchestration control unit 570 may output an error indicating the above situation. This is because a large quantity of the capacity of the storage apparatus 700 is consumed when the replica data is created more than necessary.

The orchestration control unit 570 may determine the node 111 where the second virtual machine is arranged from among the nodes 111 which can provide the resource requested by the second virtual machine (or processing performed by the second virtual machine).

The orchestration control unit 570 may store equal to or larger than a predetermined number of the data blocks of the plurality of data blocks included in a single file in a single node 111. According to this, processing for obtaining the data block from the remote node 111 is reduced in a case where one file is reconstructed from the plurality of data blocks. Accordingly, the load relative to the network bandwidth between the nodes is reduced.

The orchestration control unit 570 may automatically configure the local access values so that the local access value requested by the second processing becomes larger than that requested by the first processing. This is because a frequency to access the data often becomes higher in the processing at the latter stage in a case of the multistage processing in which the large-scale data is divided into some stages and performed.

The first processing may be batch-type processing, and the second processing may be interactive processing. As an example of the multistage processing, there is a case where filtering processing and labeling processing of the original data as a daily batch and tabulating and integrating processing of the result of the first processing as an hourly batch are performed as the first processing. In addition, processing for interactively performing daily analyzing by using the result of the first processing is performed as the second processing. In this way, when the batch-type processing is performed relative to the large-scale data in the processing at the former stage with low frequency and the interactive processing is performed in the processing at the latter stage with high frequency, the frequency to access the data of the interactive processing at the latter stage is higher than that of the batch-type processing at the former stage.

FIG. 4 is a diagram of an exemplary data set information table 1000.

The data set information table 1000 manages data set information 1001 as a record. The data set information 1001 is configuring information on a data set (file group) regarding the input/output of each processing included in the multistage processing.

The data set information 1001 may include a data set ID 1010, a data source ID 1020, a root directory 1030, a primary data storage node 1040, a primary data storage method 1050, a secondary data storage node 1060, and a secondary data storage method 1070 as field values.

The data set ID 1010 is information to uniquely identify the data set in the distribution system 1. The data set ID 1010 may be a number, a string, or a combination of these. In order to guarantee uniqueness, a new data set ID 1010 may be assigned to a new data set after the entire distribution system 1 has been synchronized. Alternatively, a plurality of IDs, which does not overlap with each other, is distributed to each node, and each node may assign an unused ID of the distributed and plurality of IDs to the data set ID 1010 of a new data set.

The data source ID 1020 is information to identify a providing source (data source) of the data set of the data set ID 1010. The data source ID 1020 may be identification information of a providing source machine of the data set or identification information of the data processing information illustrated in FIG. 5.

An example of the identification information of the machine is an IP address (10.20.1.1) or a machine name (Client-PC). An example of the identification information of the data processing information is a combination (PG1-1) of the processing group ID 1210 and the sequence number 1230 of the data processing information and the like.

The root directory 1030 indicates a root directory where the data set of the data set ID 1010 is stored in the distributed file system 200. The root directory 1030 may be expressed by a full path name, an URL, or the like.

The root directory 1030 is not limited to a directory in the distributed file system 200 and may be a directory in a local file system in any node. For example, the root directory 1030 may be a combination of the node ID and the full path name of the directory in the file system of the node having the above-mentioned node ID or a combination of the node ID and the URL.

The primary data storage node 1040 indicates a node in which a primary data in the data set of the data set ID 1010 is stored. The primary data is a data preferentially accessed by the software regarding the analysis processing. The software executed in the node of the primary data storage node 1040 preferentially accesses the data stored in the node (that is, primary data). Therefore, it is preferable that the virtual machine 121 in which the software for analyzing the data set of the data set ID 101 is executed be arranged or constructed in the node of the primary data storage node 1040.

The primary data storage method 1050 indicates a method for storing the data in the node of the primary data storage node 1040. A local access value relative to the software executed in the node of the primary data storage node 1040 (for example, "local access value≥50%") may be configured to the primary data storage method 1050.

When it is preferable to store the plurality of data blocks divided from a single file in a single node as possible (that is, when it is preferable to reduce the load relative to the network bandwidth between the nodes), "integrated storage" may be configured to the primary data storage node 1040.

When it is preferable to store the plurality of data blocks divided from a single file in different nodes from each other (that is, when it is preferable to perform striping arrangement to the data blocks in a plurality of nodes) as possible, "diffusion storage" may be configured to the primary data storage node 1040.

When the plurality of data blocks may be stored in any node, "distributed storage" may be configured to the primary data storage node 1040.

The secondary data storage node 1060 indicates a node in which a secondary data in the data set of the data set ID 1010 is stored. The secondary data is a data in which the primary data is removed from the data group included in the data set. One or two or more nodes are directly configured to the secondary data storage node 1060 as information indicating a storage destination. In addition, "all nodes" or "other than primary data storage node" may be configured.

The secondary data storage method 1070 indicates a method for storing the data in the node of the secondary data storage node 1060. The configuration of the secondary data storage method 1070 may be similar to that of the primary data storage method 1050.

FIG. 5 is a diagram of an exemplary structure of the data processing information table 1200.

The data processing information table 1200 manages one or two or more data processing information 1201 in the distribution system 1 as a record. The data processing information 1201 is information about processing of the data to be analyzed.

The data processing information 1201 may include a processing group ID 1210, a priority 1220, a sequence number 1230, a program 1240, an execution trigger 1250, and request resource information as field values.

The request resource information is about a physical resource necessary for processing regarding the data processing information. The request resource information includes the number of virtual machines 1260, the number of CPUs 1261, a memory capacity 1262, a disk type 1263, a disk capacity 1264, a network bandwidth 1265, an INPUT data set ID 1270, an INPUT data narrowing condition 1271, an INPUT local access value 1272, an OUTPUT data set ID 1280, and an OUTPUT local access value 1281 as field values.

The processing group ID 1210 is information to uniquely identify a processing group in the distribution system 1. The processing group is a group in which a series of the processing to perform a predetermined analysis (multistage processing) is grouped. The processing group ID 1210 may be a number, a string, or a combination of these. The uniqueness of the processing group ID 1210 may be guaranteed similarly to the above-mentioned case of the data set ID 1010.

The priority 1220 is a value indicating the priority of the data processing information regarding the priority 1220. In the present embodiment, the priority becomes higher as the value of the priority 1220 becomes larger. The physical resource included in the distribution system 1 is finite. Therefore, the physical resource included in the distribution system 1 may be preferentially allocated or performed relative to processing regarding the data processing information 1201 with higher priority 1220 (for example, program 1240). Therefore, there is no guarantee that the physical resource is allocated to the processing regarding the data processing information 1201 with lower priority 1220 as indicated by the data processing information 1201 (for example, as indicated by the request resource information) or that the program 1240 is executed as indicated by the execution trigger 1250.

The sequence number 1230 is a value to identify each data processing information 1201 belonging to the processing group of the processing group ID 1210. Accordingly, a single processing group ID 1210 may correspond to one or two or more sequence numbers 1230. The processing regarding the data processing information 1201 belonging to the same processing group may be performed in an order of the sequence numbers 1210. That is, it may be said that the sequence number 1230 indicate an order of each processing included in the multistage processing (relationship between the former stage and the latter stage).

The program 1240 is a value to identify a program executed in the processing regarding the data processing information 1201. For example, a pathname in which the program is stored or a program name is configured to the program 1240. A plurality of IDs of the programs may be configured to the program 1240. In this case, the plurality of programs may be executed in the processing regarding the data processing information 1201. An ID of a script in which an execution order of the plurality of programs is written may be configured to the program 1240. In this case, the plurality of programs may be executed in an order written in the script in the processing regarding the data processing information 1201.

The execution trigger 1250 is a value indicating a trigger to execute the processing regarding the data processing information 1201. For example, when "5 AM, everyday" is configured to the execution trigger 1250, the program of the program 1240 is executed at five a.m. every day (regularly). For example, when "ALL" is configured to the execution trigger 1250, the program of the program 1240 is constantly executed.

Next, the request resource information will be described. The request resource information is about a physical resource necessary for the processing regarding the data processing information 1201.

The request resource information may include the number of virtual machines 1260, the number of CPUs 1261, the memory capacity 1262, the disk type 1263, the disk capacity 1264, the network bandwidth 1265, the INPUT data set ID 1270, the INPUT data narrowing condition 1271, the INPUT local access value 1272, the OUTPUT data set ID 1280, and the OUTPUT local access value 1281 as the field values.

The number of virtual machines 1260 is a value indicating the number of the virtual machines necessary for performing the processing regarding the data processing information 1201. The number of CPUs 1261 is a value indicating the number of the CPUs (or the number of cores) requested by a single virtual machine. The memory capacity 1262 is a value indicating the capacity of a main memory requested by the single virtual machine.

The disk type 1263 is a value indicating a type of a disk requested by the single virtual machine. An example of the disk type 1263 is an HDD and an SSD. The disk capacity 1264 is a value indicating a capacity of the disk requested by the single virtual machine.

The network bandwidth 1265 is a value indicating a network bandwidth requested by a single virtual machine. The number of CPUs 1261, the memory capacity 1262, the disk type 1263, the disk capacity 1264, and the network bandwidth 1265 may be considered as configuration information of the virtual machine.

When the virtual machine 121 is constructed in the node 111, the distribution system 1 determines whether the resource requested by the configuration information can be allocated from the physical resource which can be used by the node 111. When the determination is positive (the resource can be allocated), the node 111 constructs the virtual machine 121 and allocates the resource requested by the configuration information to the virtual machine.

The INPUT data set ID 1270 is a value to identify an INPUT data set. The INPUT data set is a data set input to the program of the program 1240 included in the data processing information 1201.

The INPUT data narrowing condition 1271 is a value indicating a condition for narrowing the INPUT data to be input from among the INPUT data set of the INPUT data set ID 1270.

For example, when "ALL" is configured to the INPUT data narrowing condition 1271, all the INPUT data set becomes an input target. For example, when a query conditional expression is configured to the INPUT data narrowing condition 1271, the INPUT data set suitable for the query conditional expression becomes the input target. For example, when the query conditional expression that the latest update date and time which is attribute information of the file is after a predetermined date and time is configured, the INPUT data having the latest update date and time updated after the predetermined date and time becomes the input target. The query conditional expression at this time may be expressed as "file having the latest update date and time of Jan. 1, 2010 12:00". Also, the query conditional expression for narrowing the condition by a specific keyword may be expressed as "file including a string having a string "test"", for example.

The INPUT local access value 1272 is a value indicating a percentage of the INPUT data set which can be accessed by the processing from the storage apparatus 700 of the local node 111 of the INPUT data set relative to the processing regarding the data processing information 1201. The INPUT local access value 1272 is not a value to be strictly observed and may be a target value.

For example, the INPUT local access value 1272 "100%" indicates that all the INPUT data sets relative to the processing regarding the data processing information 1201 should be stored in the local node 111 in which the processing is performed. For example, the INPUT local access value 1272 "10%" indicates that equal to or larger than 10% of all the INPUT data sets relative to the processing regarding the data processing information 1201 should be stored in the local node 111 in which the processing is performed.

The OUTPUT data set ID 1280 is a value to identify an OUTPUT data set. The OUTPUT data set is a data set which can be output from the program of the program 1240 included in the data processing information 1201.

The OUTPUT local access value 1281 is a value indicating a percentage of the OUTPUT data set to be stored in the storage apparatus 700 of the local node 111 by the processing of the OUTPUT data set according to the processing relative to the data processing information. The OUTPUT local access value 1281 is also not a value to be strictly observed and may be a target value.

For example, the OUTPUT local access value "100%" indicates that all the OUTPUT data sets according to the processing regarding the data processing information 1201 should be stored in the local node 111. For example, the OUTPUT local access value "Free" indicates that the OUTPUT data set according to the processing regarding the data processing information 1201 may be stored in any node 111.

In FIG. 5, data processing information 1201*a* belongs to a processing group of which the processing group ID 1210 is "PG1" and indicates that the sequence number 1230 of the processing group is "1".

The data processing information 1201*a* indicates that programs 1240 "Hadoop2" and "Spark/Shark" are executed with the priority 1220 "10" at the execution trigger 1250 "five a.m. everyday".

It is indicated that the processing regarding the data processing information 1201*a* is performed by two virtual machines (1260). Also, it is indicated that four CPUs (1261), a 8 GB memory capacity (1263), 1 TB HDDs (1263 and 1264), and 1 Gbps network bandwidth (1265) are necessary for constructing the single virtual machine.

The data processing information 1201*a* indicates that the data set of the OUTPUT data set ID 1280 "102" is output when all the data sets (1271) of an INPUT data set ID 1270 "101" are input to the programs 1240 "Hadoop2" and "Spark/Shark". When the data set is input/output, equal to or larger than 50% of the INPUT data set should be a local access (1270) and the OUTPUT data set may be output from anywhere (1261).

FIG. 6 is a diagram of an exemplary structure of the physical resource information table 1300.

The physical resource information table 1300 manages physical resource information 1301 of each node 111 in the distribution system 1 as a record. The physical resource information 1301 is information about specifications (performance) and usage of the physical resource included in the node 111.

The physical resource information 1301 may include a node group ID 1310, a node ID 1320, a CPU resource 1330, a memory resource 1340, a disk resource 1350, and a network resource 1360 as field values. These field values may be changed as necessary.

The node group ID 1310 is a value to uniquely identify a node group configured from one or two or more nodes 111 in the distribution system 1. The node group ID 1310 may be a number, a string, or a combination of these. The uniqueness of the node group ID 1310 may be guaranteed according to a method similar to that of the above-mentioned data set ID 1010.

The node ID 1320 is a value to uniquely identify the node 111 in the distribution system 1. Accordingly, a single node group ID 1310 may correspond to one or two or more node IDs 1320. An example of the node ID 1320 is an IP address, an URL, and a node name. The uniqueness of the node ID 1320 may be guaranteed according to a method similar to that of the above-mentioned data set ID 101.

The CPU resource 1330 is information about a resource of the CPU included in the node 111 of the node ID 1320. The CPU resource 1330 may include specs 1331 indicating the performance of the CPU and the like, a sum total 1332 indicating the number of the CPUs or cores, and an allocation rate 1333 indicating a percentage of the allocated (in use) CPU or core relative to the sum total 1332 as subfield values.

The memory resource 1340 is information about a resource of the memory included in the node 111 of the node ID 1320. The memory resource 1340 may include a sum total 1341 indicating a memory capacity and an allocation rate 1342 indicating a percentage of the allocated (allocated) capacity relative to the sum total 1341 as the subfield values.

The disk resource 1350 is information about a resource of the disk included in the node 111 of the node ID 1320. The disk resource 1350 may include specs 1351 indicating a kind of the disk and the like, a sum total 1352 indicating a capacity of the disk, and an allocation rate 1353 indicating a percentage of the allocated (allocated) capacity relative to the sum total 1352 as the subfield values.

A single node ID 1320 may correspond to a plurality of disk resources 1350. For example, when an SSD and a Serial ATA (SATA) disk are mounted in the node 111 of a single node ID 1320, the node ID 1320 may correspond to the disk resource 1350 having the specs 1351 of the SSD and the SATA.

The network resource 1360 is information about a resource of the network included in the node 111 of the node ID 1320. The network 1360 may include specs 1361 indicating a kind of the network and the like, a sum total 1362 indicating a network bandwidth, and an allocation rate 1363 indicating a percentage of the allocated (allocated) bandwidth relative to the sum total 1362 as the subfield values.

A single node ID 1320 may correspond to a plurality of network resources 1360. For example, when the node 111 of the single node ID 1320 corresponds to the Ethernet (registered trademark) and a Fibre Channel, the node ID 1320 may correspond to the network resource 1360 including the respective specs 1361 of the Ethernet and the Fibre Channel.

FIG. 7 is a diagram of an exemplary structure of the virtual machine information table 1400.

The virtual machine information table 1400 manages virtual machine information 1401 of each node 111 in the distribution system 1 as a record. The virtual machine information 1401 is information about specifications (performance) and usage of the virtual machine included in the node 111.

The virtual machine information 111 may include a virtual machine ID 1410, a node ID 1420, the number of CPUs 1430, a memory capacity 1440, a disk capacity 1450, a network bandwidth 1460, and a use state 1470 as field values. These field values may be changed as necessary.

The virtual machine ID 1410 is a value to uniquely identify the virtual machine 121 in the distribution system 1. The uniqueness of the virtual machine ID 1410 may be guaranteed according to a method similar to that of the above-mentioned data set ID 1010.

The node ID 1420 is a value to uniquely identify the node 111 in which the virtual machine 121 of the virtual machine ID 1410 is stored. The node ID 1420 and the node ID 1320 in FIG. 6 may use the IDs of the same system.

The number of CPUs 1430 is a value indicating the number of virtual CPUs or cores included (allocated) in the virtual machine 121 of the virtual machine ID 1410.

The memory capacity 1440 is a value indicating a virtual memory capacity included (allocated) in the virtual machine 121 of the virtual machine ID 1410.

The disk capacity 1450 is a value indicating a virtual disk capacity included (allocated) in the virtual machine 121 of the virtual machine ID 1410.

The network bandwidth 1460 is a value indicating a virtual network bandwidth included (allocated) in the virtual machine of the virtual machine ID 1410.

The use state 1470 is a value indicating processing performed in the virtual machine 121 of the virtual machine ID 1410. The value indicating the processing may be the processing group ID 1210 and/or the sequence number 1220.

For example, a virtual machine information 1401*a* in FIG. 7 indicates that a virtual machine 121 of a virtual machine ID 1410 "VM1" is constructed in a node 111 of a node ID 1420 "Node1". The virtual machine information 1401*a* indicates that the virtual machine 121 of the virtual machine ID 1410 "VM1" has "four" virtual CPUs (1430), a "8 GB" virtual memory (1440), a "1 TB" virtual disk (1450), and a "1 Gbps" virtual network bandwidth (1460). The virtual machine information 1401*a* indicates that the virtual machine 121 of the virtual machine ID 1410 "VM1" performs the processing regarding the processing group ID "PG1" (1470).

FIG. 8 is a diagram of an exemplary structure of the data block storage information table 1500.

The data block storage information table 1500 manages data block storage information 1501 in the distribution system 1 as a record. The data block storage information 1501 is information about storage places of the data blocks divided from the file.

The data block storage information table 1500 is managed by the distributed file system control unit 520 in each node 111 and may be synchronized between the nodes 111 in the distribution system 1 as necessary.

The data block storage information 1501 may include a data block ID 1510, a file ID 1520, a file offset 1530, a data set ID 1540, the number of stored data 1550, a storage place 1560 as the field values.

The data block ID 1510 is a value to uniquely identify each data block divided from the file in the distribution system 1. The uniqueness of the data block ID 1510 may be guaranteed according to a method similar to that of the above-mentioned data set ID 1010.

The file ID 1520 is a value to uniquely identify the file in the distribution system 1. The uniqueness of the file ID 1520 may be guaranteed according to a method similar to that of the above-mentioned data set ID 1010.

The file offset 1530 is a value indicating a position of an offset of the data block of the data block ID 1510 in the file of the file ID 1520.

The data set ID 1540 is a value indicating a data set ID of the data set to which the file of the file ID 1520 belongs. The data set ID 1540 and the data set ID 1010 in FIG. 4 may use the IDs of the same system.

The number of stored data 1550 is a value indicating the number of the redundant (copied) and stored data blocks of the data block ID 1510. The number of the redundant and stored data blocks may be configured as a default value of the distribution system 1 and may be configured for each data block. The redundant and stored data block is referred to as the replica data. The number of stored data 1550 may be a total of original data blocks and the replica data. Also, the number of stored data 1550 may be the number of the replica data.

The storage place 1560 is a value indicating the node 111 and a pathname in which the data block of the data block ID 1510 is stored. When there is a plurality of the replica data of the data block ID 1510, the storage information 1560 may include the respective storage places of the plurality of replica data.

Figure 9:
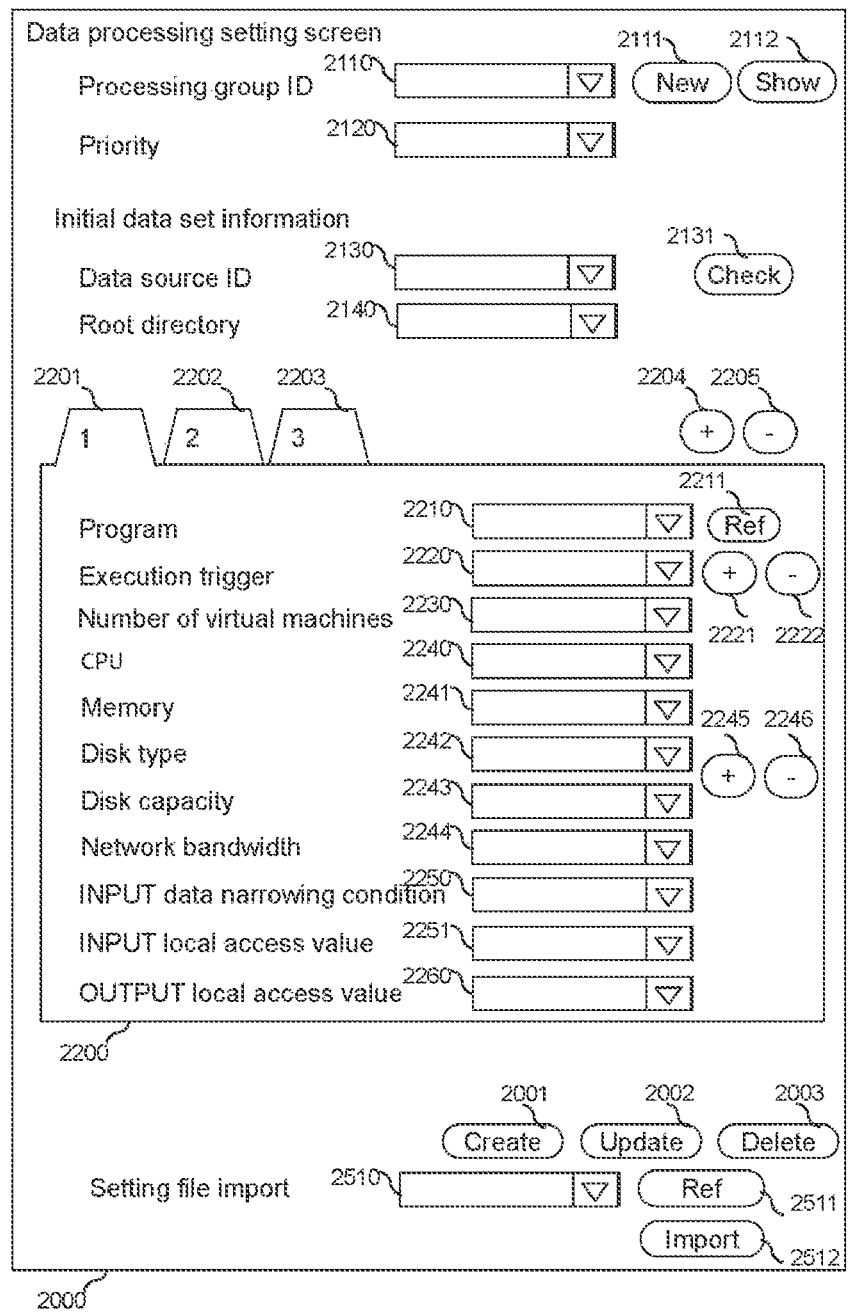
FIG. 9 is a diagram of an exemplary structure of a data processing configuring screen.

FIG. 9 is a diagram of an exemplary structure of the data processing configuring screen 2000.

The data processing configuring screen 2000 is configured as a kind of a graphical user interface (GUI) and may be used to register information with the data processing information table 1200 by an administrator.

For example, when the administrator accesses a certain node 111 (or the management machine 51) in the distribution system 1 via a client machine 50, the data processing configuring screen 2000 is displayed on a predetermined display of the client machine 50. A value configured in the data processing information table 1200 may be displayed on the data processing configuring screen 2000. When the value has not been configured, a default value may be displayed on the data processing configuring screen 2000.

The data processing configuring screen 2000 includes an input area to configure a field value of the data processing information 1201.

When a value is input in a processing group ID area 2110, one or two or more pieces of the data processing information 1201 having the input value as the processing group ID 1210 is specified in the data processing information table 1200. Here, the specified one or two or more pieces of the data processing information 1201 is referred to as "data processing information group". That is, the data processing information group includes one or two or more data processing information to be configured.

When the administrator inputs the value in the processing group ID area 2110 and presses a "New" button 2111, new data processing information 1201 which has the value input in the processing group ID area 2110 as the processing group ID 1210 is generated.

When the administrator inputs the value in the processing group ID area 2110 and presses a "Show" button 2112, existing data processing information 1201 which has the value input in the processing group ID area 2110 as the processing group ID 1210 is extracted. The extracted value which has been configured to the data processing information 1201 is displayed in each input area to be described.

The value input in the priority area 2120 is configured as the priority 1220 of the data processing information 1201.

In an item of initial data set information, a value input in a data source ID area 2130 is configured as a data source ID 1020 of new data set information 1001. The new data set information 1001 is newly registered with the data set information table 1000.

The data processing configuring screen 2000 may include a "Check" button 2131 to determine whether the input data source ID is appropriate (whether to access the data source based on the specified information). For example, when the administrator presses the "Check" button 2131 after the value has been input in the data source ID area 2130, the check result may be displayed on the data processing configuring screen 2000.

In the item of the initial data set information, a value input in a root directory area 2140 is configured as a root directory 1030 of the new data set information 1001.

The data processing configuring screen 2000 includes the GUI to configure the data processing information corresponding to the sequence number 1230 with respect to the plurality of data processing information 1201 included in the data processing information group. For example, the data processing configuring screen 2000 includes a tab area 2200 to configure the data processing information for each sequence number. The sequence numbers may be displayed in tabs 2201, 2202, and 2203.

For example, in FIG. 9, the tab 2201 indicates the tab area 2200 to configure the data processing information of sequence number "1" and the tab 2202 indicates the tab area 2200 to configure the data processing information of sequence number "2". Also, the tab 2203 indicates the tab area 2200 to configure the data processing information of sequence number "3". In FIG. 9, it is indicated that the tab area 2200 to configure the data processing information of sequence number "1" is selected. Here, the data processing information of the target data processing information corresponding to the sequence number of the selected tab is referred to as "target data processing information".

The tab (sequence number) may be optionally added and deleted. For example, in FIG. 9, when a "+" button 2204 is pressed, a new tab (sequence number) may be added, and when a "−" button 2205 is pressed, the final tab (sequence number) (or an active tab) may be deleted.

A value input in a program area 2210 is configured as the program 1240 in the target data processing information. For example, the administrator inputs a pathname or a program name in which the program is stored in the program area 2210.

When a "Ref" button 2211 is pressed, the pathname in which the program input in the program area 2210 is stored is searched from the file system, and the result may be displayed.

A value input in an execution trigger area 2220 is configured as the execution trigger 1250 in the target data processing information. When the "+" button 2221 is pressed, the execution trigger area 2220 is added. Then, a plurality of processing execution triggers may be input. When the "−" button 2222 is pressed, one of the plurality of processing execution triggers may be deleted.

A value input in an area of the number of virtual machines 2230 is configured as the number of virtual machines 1260 in the target data processing information.

The physical resource to be allocated to each virtual machine is input as follows. A value input in a CPU area 2240 is configured as the number of CPUs 1261 in the target data processing information. A value input in a memory area 2241 is configured as the memory capacity 1262 in the target data processing information.

A value input in a disk type area 2242 is configured as the disk type 1263 in the target data processing information. A value input in a disk capacity area 2243 is configured as the disk capacity 1264 in the target data processing information. When the "+" button 2245 is pressed, the disk type area 2242 and the disk capacity area 2243 are added, and a plurality of disk types and disk capacities may be input. When the "−" button 2246 is pressed, one of the plurality of disk types and disk capacities may be deleted.

A value input in a network region 2244 is configured as the network 1265 in the target data processing information.

Information regarding the INPUT data set is input as follows. A value input in an INPUT data narrowing condition area 2250 is configured as the INPUT data narrowing condition 1271 in the target data processing information.

A value input in an INPUT local access value area 2251 is configured as the INPUT local access value 1272 in the target data processing information. A value input in an OUTPUT local access value area 2260 is configured as the OUTPUT local access value 1281 in the target data processing information.

A recommended value may be automatically configured as the INPUT local access value 1272 and/or the OUTPUT local access value 1281. The recommended value of the INPUT local access value 1272 may become smaller as the sequence number becomes smaller, and the recommended value may become larger as the sequence number becomes larger. For example, processing including two stages is configured, it may be assumed that a recommended value of the INPUT local access value at a first stage (sequence number "1") be 50%. It may be assumed that a recommended value of the INPUT local access value at a second stage (sequence number "2") in which the processing is performed by using the output result of the first stage be 100%.

By configuring the INPUT local access value 1272 in this way, a frequency of the local access can be increased in a case where the processing at the latter stage has a narrower data access range and frequently accesses the data. Accordingly, an overhead of the processing in the whole multistage processing can be reduced.

Also, the load of the administrator is reduced by automatically configuring (showing) the recommended value of the INPUT local access value 1272 by the system. That is, the administrator is released from the load to configure the local access value for each processing while considering the number of processing sequences in the multistage processing.

When a "Create" button 2001 is pressed, the target data processing information to which the value input in the above has been configured is newly registered with the data processing information table 1200. At this time, when the data processing information having the same processing group ID has already been registered with the data processing information table 1200, a new registration error may be displayed.

When an "Update" button 2002 is pressed, the target data processing information to which the value input in the above has been configured is updated and registered with the data processing information table 1200. At this time, when the data processing information having the same processing group ID has not been registered with the data processing information table 1200, an update registration error may be displayed.

Also, the value input in the target data processing information may be verified at the time of the above-mentioned new registration and update registration. When the values do not match or it is difficult to cope with the situation by the current physical resource, an error indicating that case may be displayed.

Also, when a value is input in the processing group ID area 2110 and a "Delete" button 2003 is pressed, data processing information having the input value of the processing group ID 1210 may be deleted from the data processing information table 1200.

A value which can be input from the data processing configuring screen 2000 may be imported to the distribution system 1 as a predetermined configuring file. For example, when a configuring file name is input in a configuring file import area 2510 in FIG. 9 and an "Import" button 2512 is pressed, a content of the configuring file may be registered with the data processing information table 1200 as the target data processing information. Also, when a "Ref" button 2511 is pressed, a pathname in which a configuring data input to the configuring file import area 2510 is stored is searched from the file system. Then, the result may be displayed.

Figure 10:
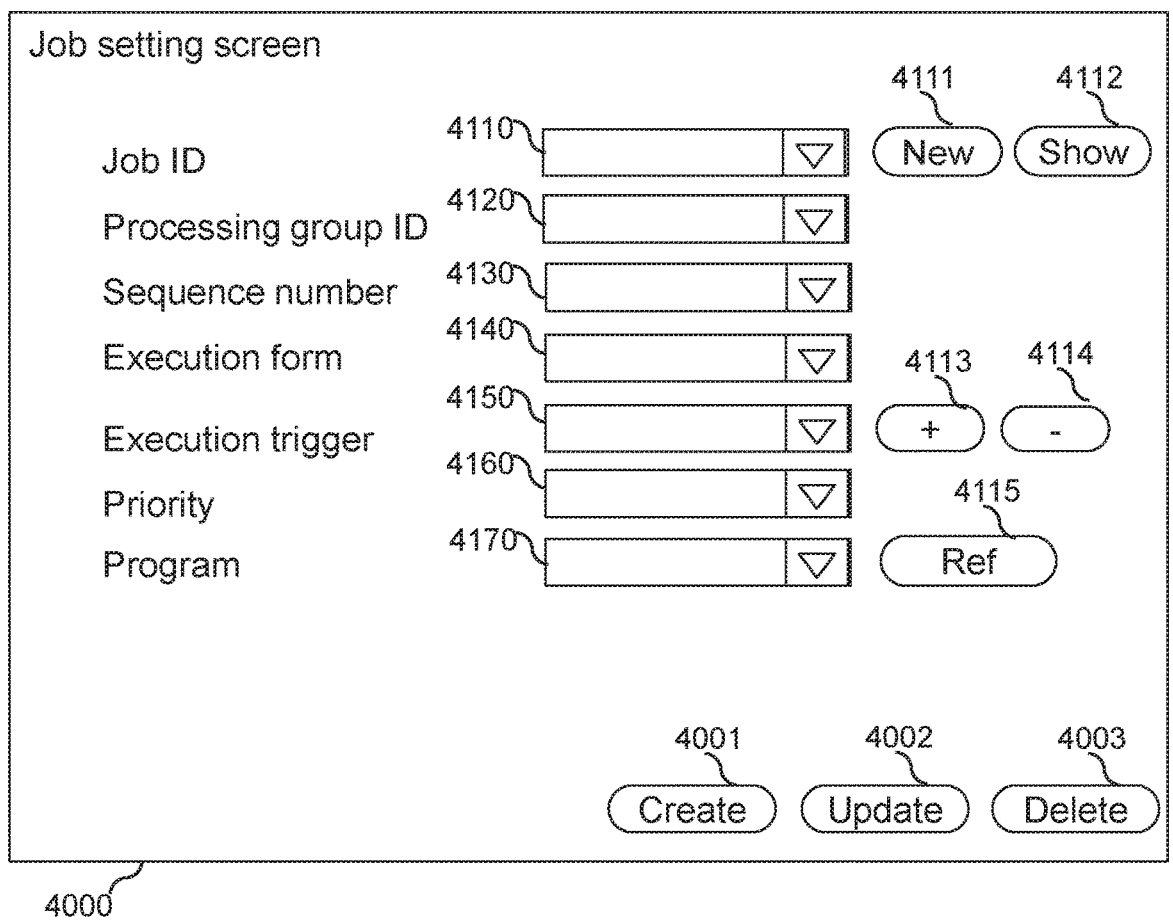
FIG. 10 is a diagram of an exemplary structure of a job configuring screen.

FIG. 10 is a diagram of an exemplary structure of the job configuring screen 4000.

The job configuring screen 4000 is configured as a kind of the GUI and may be used to register the job schedule information 1601 with the job schedule information table 1600 by the administrator. For example, when the administrator accesses a certain node 111 (or the management machine 51) in the distribution system 1 via the client 50, the job configuring screen 4000 is displayed on a predetermined display of the client 50. The value configured to the job schedule information table 1600 may be displayed on the job configuring screen 4000. When the value has not been configured, a default value may be displayed on the job configuring screen 4000.

The job configuring screen 4000 includes an input area to configure a field value of the job schedule information 1601.

When a value is input in a job ID area 4110, the job schedule information 1601 having the input value as the job ID 1610 is specified in the job schedule information table 1600. The specified job schedule information 1601 is referred to as "target job schedule information". That is, the target job schedule information is job schedule information to be configured.

When the value is input in the job ID area 4110 and a "New" button 4111 is pressed, new job schedule information having the value input in the job ID area 4110 as the job ID 1610 may be generated. When a value is input in the job ID area 4110 and a "Show" button 4112 is pressed, existing job schedule information having the value input in the job ID area 4110 as the job ID 1610 is extracted and a value configured to the extracted job schedule information may be displayed in each input area to be described.

A value input in a processing group ID area 4120 is configured as the processing group ID 1620 in the target job schedule information.

A value input in a sequence number area 4130 is configured as the sequence number 1630 in the target job schedule information.

A value input in an execution form area 4140 is configured as an execution form 1650 of the target job schedule information.

A value input in an execution trigger area 4150 is configured as an execution data and time 1640 in the target job schedule information. The operation in a case where the "+" button 4113 and the "−" button 4114 are pressed may be similar to that of the "+" button 2221 and the "−" button 2222 in the execution trigger area 2220 in FIG. 9.

A value input in the priority area 4160 is configured to be the priority 1670 of the target job schedule information.

In a case where a value is input in the program area 4170, the program of the value input in the program area 4170 may be executed instead of the program 2210 in which the processing group ID input in the processing group ID area 4120 has been configured when the job of the job ID 4110 is executed.

When a "Ref" button 4115 is pressed, a pathname in which the program input in the program area 4175 is stored is searched from the file system, and the result is displayed.

When a "Create" button 4001 is pressed, the target job schedule information including the value input in the above is newly registered with the job schedule information table 1600. At this time, when the job schedule information having the same job ID has already been registered with the job schedule information table 1600, a new registration error may be displayed.

When an "Update" button 4002 is pressed, the target job schedule information including the value input in the above is updated and registered with the job schedule information table 1600. At this time, when the job schedule information having the same job ID has not been registered with the job schedule information table 1200, an update registration error may be displayed.

When the value is input in the job ID area 4110 and a "Delete" button 4003 is pressed, the job schedule information 1601 having the value of the input job ID 1610 may be deleted from the job schedule information table 1600.

An example in which the GUI is used to input, update, and display the value has been described in the above. However, other steps may be used. A command line interface (CLI) or an application programming interface (API) may be used as the other steps.

Figure 11:
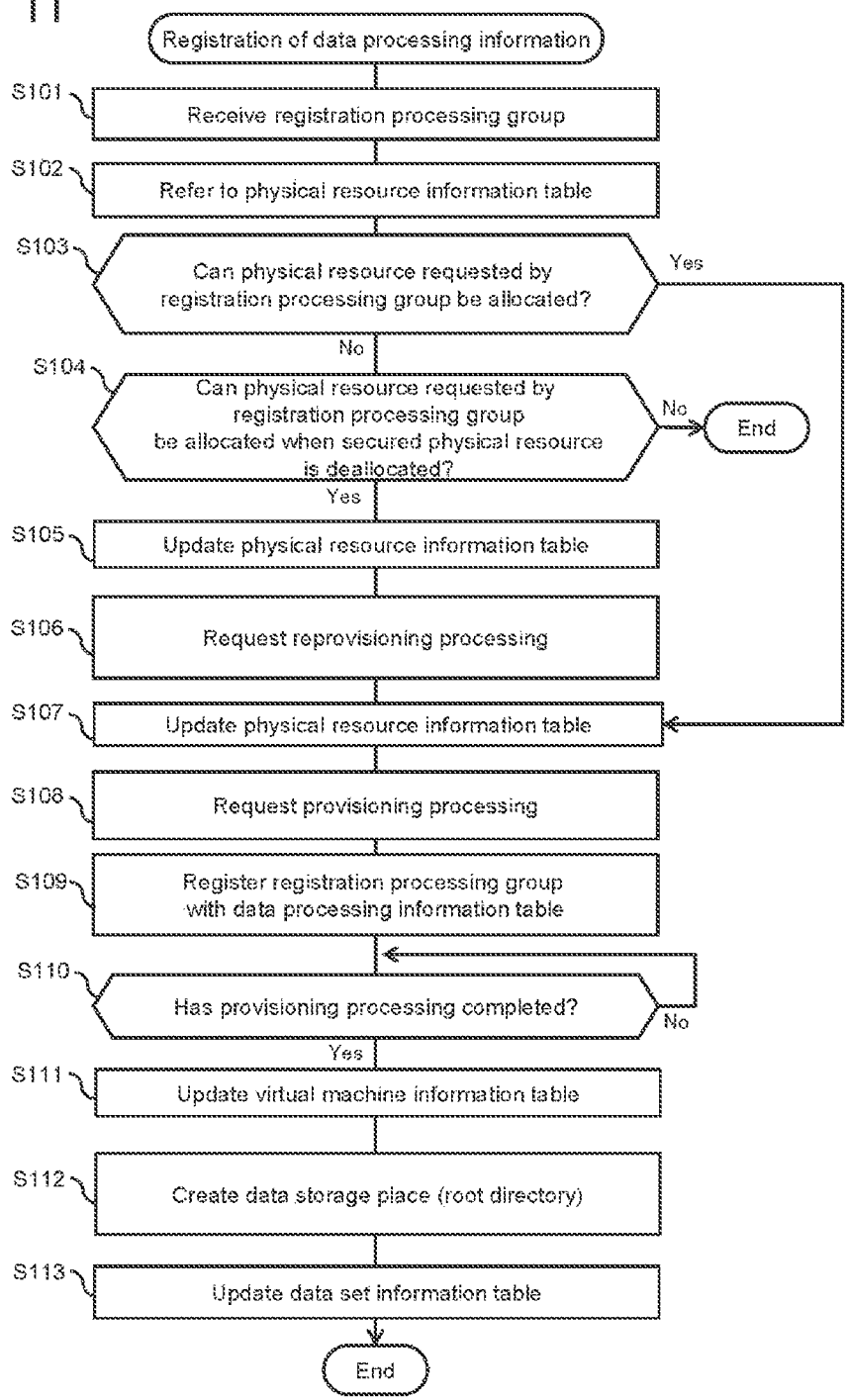
FIG. 11 is a flowchart of exemplary processing regarding registration of data processing information.

FIG. 11 is a flowchart of exemplary processing regarding registration of the data processing information.

The orchestration control unit 570 receives a registration processing group including the data processing information input to the data processing configuring screen 2000 (S101).

The orchestration control unit 570 refers to the physical resource information table 1300 (S102) and determines whether the physical resource requested by the registration processing group can be allocated (S103). The determination processing will be described in detail below (refer to FIG. 12).

When the physical resource requested by the registration processing group can be allocated (S103: Yes), the orchestration control unit 570 proceeds to processing in S107 to be described.

When the physical resource requested by the registration processing group cannot be allocated (S103: No), the orchestration control unit 570 proceeds to next processing in S104.

The orchestration control unit 570 determines whether the physical resource requested by the registration processing group can be allocated when the physical resource allocated by the data processing information having lower priority than that of the registration processing group is deallocated (S104). For example, the determination will be made as follows.

First, it is assumed that all the physical resources included in the distribution system 1 be the target. Then, it is determined whether the physical resource requested by the registration processing group can be allocated. This determination is a first determination. The first determination corresponds to FIG. 12 to be described. When it is determined in the first determination that the physical resource cannot be allocated, the orchestration control unit 570 ends this processing as an error (S104: No).

When it is determined in the first determination that the physical resource can be allocated, the orchestration control unit 570 subsequently extracts the data processing information 1201 having the priority lower than that of the registration processing group from the data processing information table 1200. When this data processing information cannot be extracted, the orchestration control unit 570 ends this processing as an error (S104: No).

When this data processing information can be extracted, the orchestration control unit 570 subsequently determines whether the physical resource requested by the registration processing group can be allocated when the virtual machine regarding the extracted data processing information 1201 with low priority is migrated to another node 111. This determination is a second determination.

When it is determined in the second determination that the physical resource can be allocated, the orchestration control unit 570 specifies the physical resource allocated to the virtual machine to be migrated. Also, the orchestration control unit 570 extracts a node to be a migration destination candidate of the virtual machine to be migrated. The orchestration control unit 570 proceeds to processing in S105 (S104: Yes).

When it is determined in the second determination that the physical resource cannot be allocated, the orchestration control unit 570 subsequently determines whether the physical resource requested by the registration processing group can be allocated when the physical resource allocated to the virtual machine regarding the extracted data processing information with low priority is deallocated (that is, the virtual machine is stopped). This determination is a third determination.

When it is determined in the third determination that the physical resource can be allocated, the orchestration control unit 570 specifies the physical resource allocated to the virtual machine to be deallocated. The orchestration control unit 570 proceeds to the processing in S105 (S104: Yes).

When it is determined in the third determination that the physical resource group cannot be allocated, the orchestration control unit 570 ends this processing as an error (S104: No).

The orchestration control unit 570 reflects the deallocation of the physical resource according to the migration or stop of the virtual machine to the physical resource information table 1300 in S105 (S105).

The orchestration control unit 570 requests reprovisioning processing relative to the job control unit 550 (S106). The reprovisioning processing is processing to change the allocation of the physical resource. The reprovisioning processing will be described in detail below (refer to FIG. 15).

The orchestration control unit 570 reflects the allocation of the physical resource regarding the registration processing group to the physical resource information table 1300 (S107).

The orchestration control unit 570 requests provisioning processing relative to the job control unit 550 (S108). The resource allocation control unit 540 which has received the request to perform the provisioning processing generates a virtual machine to which the physical resource requested (allocated) from the node is allocated and installs a software for the analysis processing in the virtual machine. The processing may be performed by the hypervisor control unit 530 which has received a request from the resource control unit 540.

The orchestration control unit 570 registers the data processing information included in the registration processing group with the data processing information table 1200 (S109).

The orchestration control unit 570 waits for the completion of the provisioning processing in S108 (S110: No). When the provisioning processing has been completed (S110: Yes), the orchestration control unit 570 proceeds to next processing in S111.

In S111, the orchestration control unit 570 reflects the results of the provisioning processing in S108 and the reprovisioning processing in S106 to the virtual machine information table 1400 (S111).

The orchestration control unit 570 creates a data storage place (root directory) in the distributed file system 200 (S112). The root directory relative to an initial data set may be a value input in the root directory area 2140 in the data processing configuring screen 2000. A root directory relative to the other data set may be automatically determined by the distribution system 1.

The orchestration control unit 570 updates the data set information table 1000 (S113) and ends this processing.

According to the above processing, environment to perform the processing regarding the registration processing group input via the data processing configuring screen 2000 is constructed in the distribution system 1.

Figure 12:
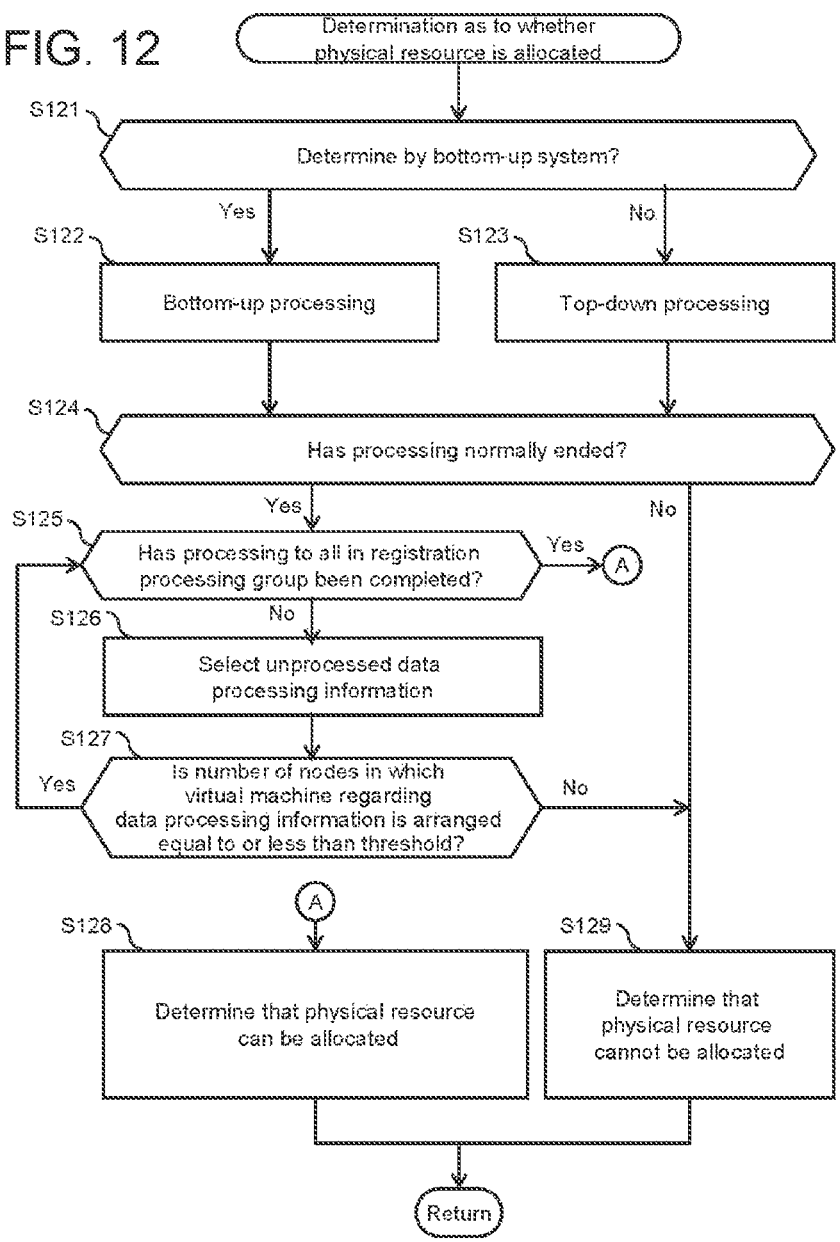
FIG. 12 is a flowchart of exemplary processing regarding determination as to whether a physical resource is allocated.

FIG. 12 is a flowchart of exemplary processing regarding determination as to whether a physical resource is allocated. The present processing corresponds to the determination processing in S103 or S104 in FIG. 11.

The orchestration control unit 570 selects a system for determining whether the physical resource is allocated (S121). The system is selected from the bottom-up system or the top-down system. The administrator may select the system, and the distribution system 1 may automatically select the system based on the configuration.

The bottom-up system is a method for evaluating whether the physical resource necessary for the processing regarding the target data processing information can be allocated from the target data processing information with a smaller sequence number of the plurality of target data processing information belonging to the same processing group. Since the bottom-up system previously evaluates the target data processing information regarding the former stage in the multistage processing, the processing regarding the former stage in the multistage processing is generally integrated in a specific physical node group.

The top-down system is a method for evaluating whether the physical resource necessary for the processing regarding the target data processing information can be allocated from the target data processing information with a larger sequence number of the plurality of target data processing information groups belonging to the same processing group. Since the top-down system previously evaluates the target data processing information regarding the latter stage in the multistage processing, the processing regarding the latter stage in the multistage processing is generally integrated in a specific physical node group.

When the bottom-up system is selected (S121: Yes), the orchestration control unit 570 performs bottom-up processing (S122). The bottom-up processing will be described in detail below (refer to FIG. 13).

When the top-down system is selected (S121: No), the orchestration control unit 570 performs top-down processing (S123). The top-down processing will be described in detail below (refer to FIG. 14).

After that, the orchestration control unit 570 determines whether the bottom-up processing (S122) or the top-down processing (S123) has normally been ended (S124). When the processing ends with an error (S124: No), the orchestration control unit 570 determines that the physical resource cannot be allocated (S129) and returns to the processing illustrated in FIG. 11.

When the processing has been normally ended (S124: Yes), the orchestration control unit 570 determines whether the processing in S125 to S127 has been completed regarding all the data processing information in the registration processing group (S125).

When the processing regarding all the data processing information in the registration processing group has been completed (S125: Yes), the orchestration control unit 570 determines that the physical resource can be allocated (S128). The determination result is transmitted to the processing indicated in FIG. 11, and at the same time, the procedure returns to the processing in FIG. 11. At this time, the orchestration control unit 570 transmits information necessary for the update in the update processing of the physical resource information table 1300 which is performed after the procedure returns to the processing in FIG. 11 to the processing indicated in FIG. 11. That is, the orchestration control unit 570 transmits both the determination result of S128 and information on the physical resource to be allocated to the processing indicated in FIG. 11. Here, examples of the information on the physical resource to be transmitted to the processing indicated in FIG. 11 are allocation physical node identification information of the virtual machine to be created in each processing sequence regarding the data processing content, the number of the virtual machines to be created, information on a computer resource (CPU, memory, disk, network, and the like) used by the virtual machine, and the like.

When the unprocessed data processing information is left in the registration processing group (S125: No), the orchestration control unit 570 selects one of the unprocessed data processing information (S126). That is, one of the unprocessed sequence numbers in the registration processing group is selected.

Next, the orchestration control unit 570 calculates the number of the nodes where the virtual machine 121 regarding the selected data processing information is arranged. That is, the orchestration control unit 570 obtains the number of the nodes to be used for the processing regarding the sequence number of the selected data processing information. The number of the nodes where the virtual machine is arranged may be calculated based on the information included in a node list. The node list is created in the bottom-up processing in S122 or the top-down processing in S123. The node ID, the sequence number, and the value of the physical resource allocated in the node are corresponded to and registered with the node list, and the detail will be described below.

The orchestration control unit 570 determines whether the number of the nodes where the virtual machine is arranged is equal to or less than a threshold (S127). Here, the replica data is arranged in each node where the virtual machine 121 is arranged, the orchestration control unit 570 may determine whether the number of the replica data is equal to or less than the threshold. This is in order to prevent that a large quantity replica data is generated and a large number of the disk resources is consumed. The threshold may be configured as a default value and may be individually configured by the administrator.

When the number of the nodes where the virtual machine is arranged is equal to or less than the threshold (S127: Yes), the orchestration control unit 570 returns to the processing in S125. When the number of the nodes where the virtual machine is arranged is larger than the threshold (S127: No), the orchestration control unit 570 determines that the physical resource cannot be allocated (S129) and returns to the processing illustrated in FIG. 11.

With the above processing, it is determined whether the physical resource can be allocated relative to the processing regarding the registration processing group.

Figure 13:
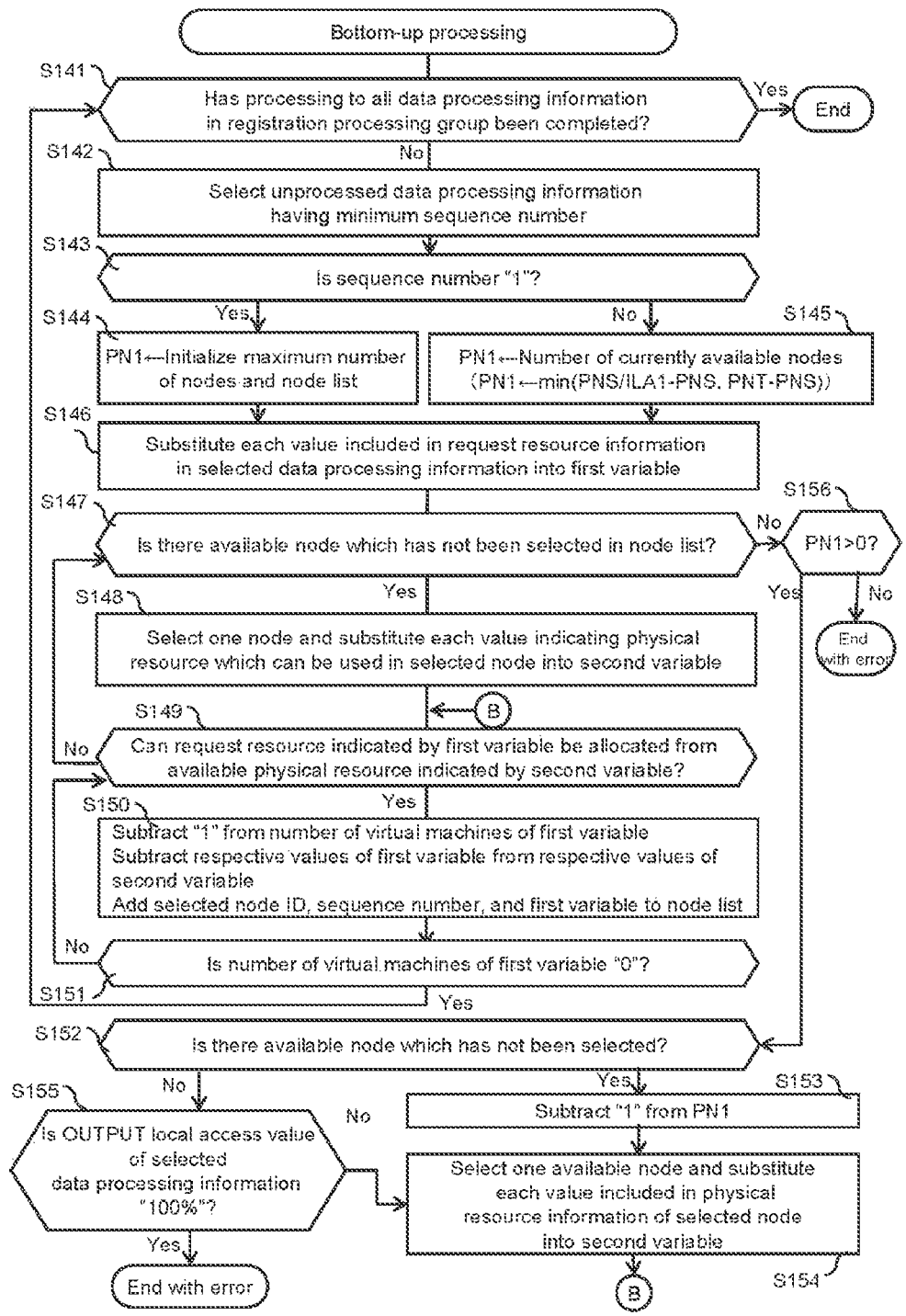
FIG. 13 is a flowchart of exemplary bottom-up processing.

FIG. 13 is a flowchart of exemplary bottom-up processing. The present processing corresponds to S122 in FIG. 12.

When the processing in S141 to S151 relative to all the data processing information in the registration processing group has been completed (S141: Yes), the orchestration control unit 570 ends the processing.

When the unprocessed data processing information is left (S141: No), the orchestration control unit 570 selects the data processing information with minimum sequence number from among the unprocessed information (S142). That is, the following processing is performed from the data processing information at the former stage in the multistage processing in an order.

Next, the orchestration control unit 570 determines whether the sequence number of the selected data processing information is "1" (S143). The sequence number indicates the number of the stages in the multistage processing.

When the sequence number is "1" (S143: Yes), the orchestration control unit 570 substitutes the number of the nodes included in the distribution system 1 (maximum number of the nodes) into a variable PN1. Here, the variable PN1 indicates the number of the nodes which can be a target in which the physical resource is allocated from among the node group belonging to the computer system in physical resource allocating processing for the virtual machine in a case where the sequence number is N (N=1 in S144) in the present processing. In the present processing, the node which is suitable for a predetermined condition is appropriately selected as described below, and the necessary physical resource is allocated from the selected node. The variable PN1 is subtracted when the node is selected. According to this, when the variable PN1 is "0", it can be determined that there is no node in which the physical resource can be allocated. That is, the value of the variable PN1 can be used as one of termination conditions of the present processing.

Also, the orchestration control unit 570 initializes the node list (S144). The orchestration control unit 570 proceeds to the processing in S146. Here, in the present processing, the node list manages the number of the virtual machines to be created in the node and the information on the physical resource to be allocated to each virtual machine (CPU, memory, disk, network, and the like) for each sequence number of the data processing information. The initialization of the node list may be an operation to make the information registered with the node list empty (NULL). In the node list, the identification information of the node selected as a creation target of the virtual machine from among a node group belonging to a computer system is appropriately added. Also, when the physical resource is actually allocated to the node and it is determined that the virtual machine is created, the information below is corresponded and managed in the node list. The information includes information on the physical resource to be actually allocated, the sequence number corresponding to the processing for using the virtual machine (that is, information indicating the stage where the processing is performed when the multistage processing is performed), and identification information of the node. According to this, the orchestration control unit 570 can determine the number of the virtual machines necessary to be created for the processing of the sequence number and the amount of the physical resource to be allocated at the time of creating each virtual machine for each node registered in the node list by referring to the node list at the stage when the processing ends.

When the sequence number is not "1" (S143: No), the orchestration control unit 570 substitutes the number of the currently available nodes into the variable PN1 (S145). Then, the procedure proceeds to the processing in S146.

For example, the orchestration control unit 570 calculates $$PN1 = \min(PNS/ILA1 - PNS, \text{maximum number of nodes} - PNS) \quad \text{(formula 1)}.$$

Here, "PNS" indicates the number of the nodes added to the current node list. "ILA1" indicates the INPUT local access value of the data processing information selected in loop processing of this time. That is, the "ILA1" indicates the INPUT local access value regarding the processing of the sequence number at this stage in the multistage processing.

"min" is a function for returning the minimum value from among a plurality of values. Therefore, the variable PN1 is a smaller value of "PNS/ILA1-PNS" and "maximum number of nodes-PNS". Here, a value calculated by the formula "PNS/ILA1-PNS" indicates the number of the nodes which can be selected to be newly added to the node list in the loop processing of this time in consideration of the INPUT local access value of the data processing information selected in the loop processing of this time in the present processing. For example, when the value of the "ILA1" is "100%", a value of the formula 1 becomes "0". In this case, in the loop processing of this time, it is necessary to determine whether the physical resource necessary for the virtual machine can be allocated from among the nodes which have been selected before the loop processing at the former stage and added to the node list. This is because, when the above-mentioned physical resource cannot be allocated, the condition of the INPUT local access value "100%" cannot be satisfied. As a similar example, when the value of ILA1 is "50%" and the value of PNS is "1", the value of the formula 1 becomes "1". In this case, in the loop processing of this time, it is necessary to determine whether the physical resource necessary for the virtual machine can be allocated from among the single node which has been selected before the loop processing at the former stage and added to the node list and another node.

A value calculated by the formula "maximum number of nodes-PNS" means the maximum value of the node to which the physical resource has not been allocated from among the nodes belonging to the computer system. When a value calculated by the formula "PNS/ILA1-PNS" exceeds the maximum value (that is, "maximum number of nodes-PNS") in the formula 1, the maximum value is configured as the variable PN1. This prevents that a value which is unlikely in the system is configured as the variable PN1.

In S146, the orchestration control unit 570 substitutes each value of the request resource information included in the selected data processing information into a first variable (S146).

For example, the following values are respectively substituted into variables V, C, M, DT, DS, and N included in the first variable.

The number of the virtual machines of the request resource information is substituted into the variable V.

The number of the CPUs of the request resource information is substituted into the variable C.

The memory capacity of the request resource information is substituted into the variable M.

The disk type of the request resource information is substituted into the variable DT.

The disk capacity of the request resource information is substituted into the variable DS.

The network bandwidth of the request resource information is substituted into the variable N.

Next, the orchestration control unit 570 determines whether there is an available node, which has not been selected in S148 to be described, in the node list (S147). The available node is, for example, a node having available physical resource left therein. When the processing is about the sequence number "1", the node list is initialized, and it is determined that the answer to the question in S147 is NO.

When the processing is about the sequence number "2" or after and the nodes selected at the former stage are added to the node list (S147: Yes), the orchestration control unit 570 selects one node from the selected nodes and substitutes each value indicating the available physical resource in the selected node into a second variable (S148). The node to which the virtual machine at the former stage has been configured according to this step is preferentially selected as a configuring node of the other virtual machine. Each value indicating the available physical resource may be calculated based on the physical resource information of the selected node.

For example, the following values are substituted into variables C1, M1, DT1, DS1, and M1 included in the second variable.

The number of CPUs available in the selected node is substituted into the variable C1.

The memory capacity available in the selected node is substituted into the variable M1.

The disk type available in the selected node is substituted into the variable DT1.

The disk capacity available in the selected node is substituted into the variable DS1.

The network bandwidth available in the selected node is substituted into the variable N1.

The orchestration control unit 570 determines whether a request resource indicated by the first variable can be allocated from the available physical resource indicated by the second variable (S149). That is, it can be said that the orchestration control unit 570 determines whether the virtual machine to perform the processing regarding the data processing information selected in S142 can be arranged in the node selected in S148.

For example, when all the conditions "C<C1", "M<M1", "DT coincides with DT1", "DS<DS1", and "N<N1" are satisfied, the orchestration control unit 570 determines that the node can be used to configure the virtual machine therein and selects "Yes" in the determination in S149. Then, the procedure proceeds to S150. When any of the above conditions is not satisfied, the procedure returns to S147.

In S150, the orchestration control unit 570 subtracts "1" from the number of the virtual machines of the first variable. Also, orchestration control unit 570 corresponds the node ID of the selected node, the sequence number selected in S142, and a value of the physical resource allocated in the node (for example, first variable) with each other and adds them to the node list (S150). That is, since the orchestration control unit 570 has determined that the physical resource is actually allocated in the node and the virtual machine is created, the orchestration control unit 570 corresponds the information on the physical resource to be actually allocated and the sequence number corresponded to the processing for using the virtual machine (that is, information indicating the stage where the processing is performed when the multistage processing is performed) with the identification information of the node and adds it to the node list. Also, when a new node is added to the node list, it is necessary for the node or another node to hold a copy of the INPUT data in order to satisfy the condition of the INPUT local access value of the processing of the sequence number in a case where the fact that the physical resource is allocated from the other node has been registered to the node list in the loop processing of this time (processing regarding the data processing information including the same sequence number). In this case, the orchestration control unit 570 may add the information, which indicates that the copy of the target data set is redundant and stored in the node and the other node, in the node list. When the virtual machine is actually created in each node, the processing for copying the INPUT data necessary for each node is performed based on information indicating the redundant storage in a case where the information indicating the redundant storage has been registered in the node list.

In addition, the orchestration control unit 570 subtracts "1" from each value of the second variable. For example, the orchestration control unit 570 subtracts each value of the first variable from each value of the second variable as follows.

The variable C is subtracted from the variable C1.
The variable M is subtracted from the variable M1.
The variable DS is subtracted from the variable DS1.
The variable N is subtracted from the variable N1.

Next, the orchestration control unit 570 determines whether the number of the virtual machines of the first variable is "0" (S151). That is, the orchestration control unit 570 determines whether the physical resource has been allocated relative to all the virtual machines requested by the data processing information selected in S142.

When the number of the virtual machines of the first variable is not "0" (S151: No), the orchestration control unit 570 returns to the processing in S149. When the number of the virtual machines of the first variable is "0" (S151: Yes), the orchestration control unit 570 returns to the processing in S141 and selects another data processing information.

In the above-mentioned determination in S147, when there is no available node which has not been selected in S148 in the node list (S147: No), the orchestration control unit 570 proceeds to the next processing in S156.

The orchestration control unit 570 determines whether the variable PN1 is larger than "0" (S156). That is, the orchestration control unit 570 determines whether the node in which the virtual machine can be arranged is left. When there is no such a node (S156: No), it is determined that the allocation of the physical resource for the virtual machine which satisfies a predetermined condition in the present processing cannot be performed. Then, the present processing ends with an error. When there is such a node (S156: Yes), the procedure proceeds to next processing in S152.

The orchestration control unit 570 determines whether there is an available node which has not been selected (not limited to the node list) (S152). That is, the orchestration control unit 570 determines whether the node in which the virtual machine to perform the processing regarding the selected data processing information can be arranged exists in the computer system.

When there is such a node (S152: Yes), the orchestration control unit 570 subtracts "1" from the variable PN1 (S153). That is, the orchestration control unit 570 reduces the number of the available nodes.

The orchestration control unit 570 selects one node from among the available nodes and substitutes each value indicating the available physical resource in the selected node into the second variable (S154). This processing is similar to that in S148. The orchestration control unit 570 proceeds to processing in S149.

When there is no such a node in S152 (S152: No), the orchestration control unit 570 performs the following processing.

The orchestration control unit 570 determines whether the OUTPUT local access value of the selected data processing information is 100% (S155). That is, the orchestration control unit 570 determines whether an output destination of the processing regarding the selected data processing information is limited to the local node.

When the OUTPUT local access value is 100% (S155: Yes), the orchestration control unit 570 ends the processing while assuming that the error occurs. This is because the determination in S152 becomes "No" and the condition that the OUTPUT local access value is 100% cannot be satisfied.

When the OUTPUT local access value is not 100% (S155: No), the orchestration control unit 570 proceeds to the above-mentioned processing in S154.

In a case where the condition of the OUTPUT local access value is a target value, the orchestration control unit 570 may proceed to the processing in S154 even when the OUTPUT local access value is 100% (that is, the determination in S155 is "Yes").

According to the above bottom-up processing, the node list about the data processing information belonging to the registration processing group is created. According to this, the orchestration control unit 570 can determine whether the physical resource can be allocated in the processing illustrated in FIG. 12.

Figure 14:
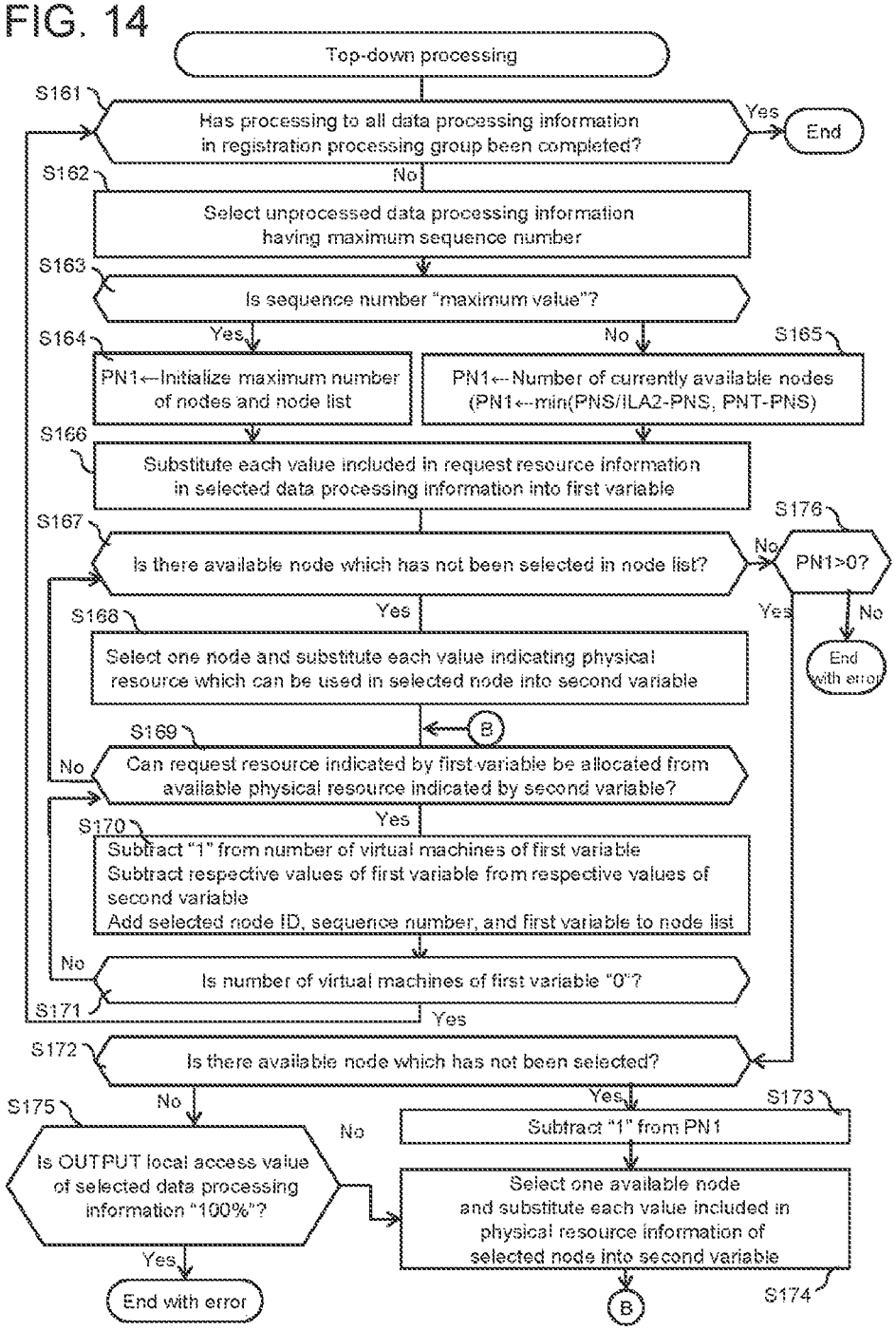
FIG. 14 is a flowchart of exemplary top-down processing.

FIG. 14 is a flowchart of exemplary top-down processing. The present processing corresponds to S123 in FIG. 12.

Processing in S161 to S176 illustrated in FIG. 14 are similar to those in S141 to S156 illustrated in FIG. 13 except for S162 (corresponding to S142), S163 (corresponding to S143), and S165 (corresponding to S145). Therefore, the processing in S162, S163, and S165 will be described below, and the description about the processing similar to those in FIG. 13 will be omitted.

In S162, the orchestration control unit 570 selects data processing information having maximum sequence number from among unprocessed data processing information (S162). That is, processing is sequentially performed from the processing to the data processing information at the latter stage in the multistage processing.

The orchestration control unit 570 determines in S163 whether the sequence number of the selected data processing information is the "maximum value" (S163).

When the sequence number is the "maximum value" (S163: Yes), the orchestration control unit 570 proceeds to the processing in S164. When the sequence number is not the "maximum value" (S163: No), the orchestration control unit 570 proceeds to the processing in S165.

In S165, the orchestration control unit 570 substitutes the number of the nodes which is available at this stage into the variable PN1 (S165) and proceeds to the processing in S166. However, the variable PN1 may be calculated according to a method different from S145 in FIG. 13 as follows.

For example, the orchestration control unit 570 calculates $$PN1 = \min(PNS/ILA2 - PNS, \text{maximum number of nodes} - PNS) \quad \text{(formula 2)}.$$

Here, the variable ILA2 indicates the INPUT local access value of the data processing information selected in the last loop processing. That is, the variable ILA2 indicates the INPUT local access value regarding the processing of the sequence number at the former stage in the multistage processing. According to this, the number of the nodes available for the processing at this stage can be calculated based on the INPUT local access value of the processing at the former stage. Other variables have been described above with reference to FIG. 13.

According to the above top-down processing, the node list about the data processing information belonging to the registration processing group is created. According to this, the orchestration control unit 570 can determine whether the physical resource can be allocated in the processing illustrated in FIG. 12.

It can be determined whether the physical resource can be allocated according to both the bottom-up processing and the top-down processing. However, the node in which the virtual machine regarding each data processing information is arranged and the physical resource to be provided to the virtual machine may be different according to the selected processing.

According to the above processing, the virtual machine is generated (deployed) in the node, and at the same time, the software regarding the analysis processing is installed in the virtual machine.

Figure 15:
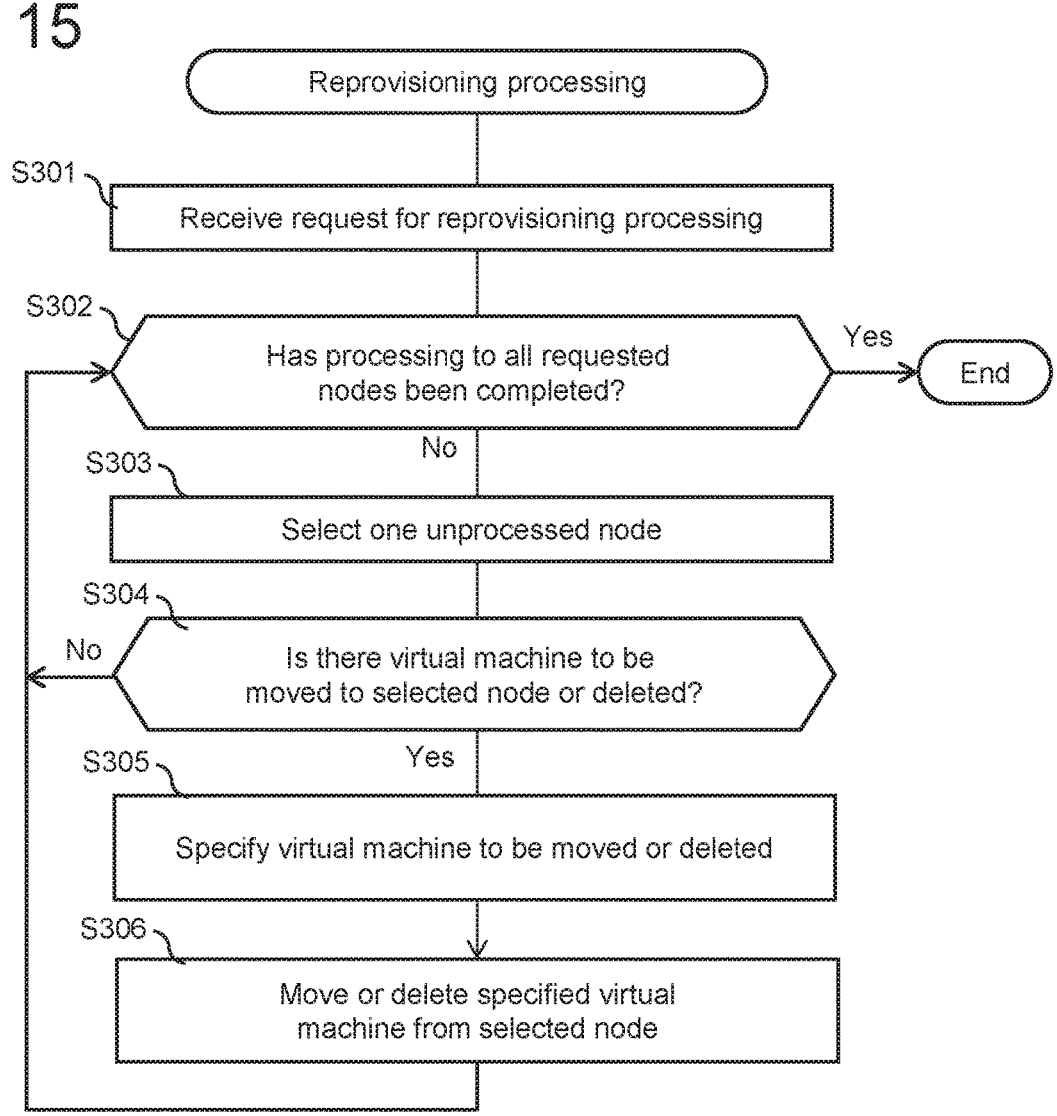
FIG. 15 is a flowchart of exemplary reprovisioning processing.

FIG. 15 is a flowchart of exemplary reprovisioning processing. The present processing corresponds to the processing in S106 in FIG. 11.

When receiving a request for the reprovisioning processing, the resource allocation control unit 540 performs the following processing (S301).

The resource allocation control unit 540 determines whether processing in S302 to S306 has been completed relative to all the requested nodes (S302). When all the processing has been completed (S302: Yes), the resource allocation control unit 540 ends the processing.

When the unprocessed nodes are left (S302: No), the resource allocation control unit 540 selects one of the unprocessed nodes (S303).

The resource allocation control unit 540 determines whether there is a virtual machine to be migrated or deleted in the selected node (S304).

When there is no such a virtual machine (S304: No), the resource allocation control unit 540 returns to S302 and performs the similar processing relative to the left unprocessed node.

When there is such a virtual machine (S304: Yes), the resource allocation control unit 540 specifies the virtual machine to be migrated or deleted in the selected node (S305).

The resource allocation control unit 540 migrates or deletes the specified virtual machine (S306). The resource allocation control unit 540 may request the hypervisor control unit 530 to perform this processing. The hypervisor control unit 530 which has received this request migrates or deletes the specified virtual machine from the node selected in S303. That is, the hypervisor control unit 530 deallocates the physical resource allocated to the specified virtual machine in the node selected in S303.

After these processing has been completed, the resource allocation control unit 540 returns to the processing in S302 and performs the similar processing relative to the other unprocessed nodes.

According to the above processing, the physical resource allocated in the virtual machine in the node is deallocated. According to this, a new virtual machine (for example, with high priority) can be generated in the node in which the physical resource is deallocated.

Figure 16:
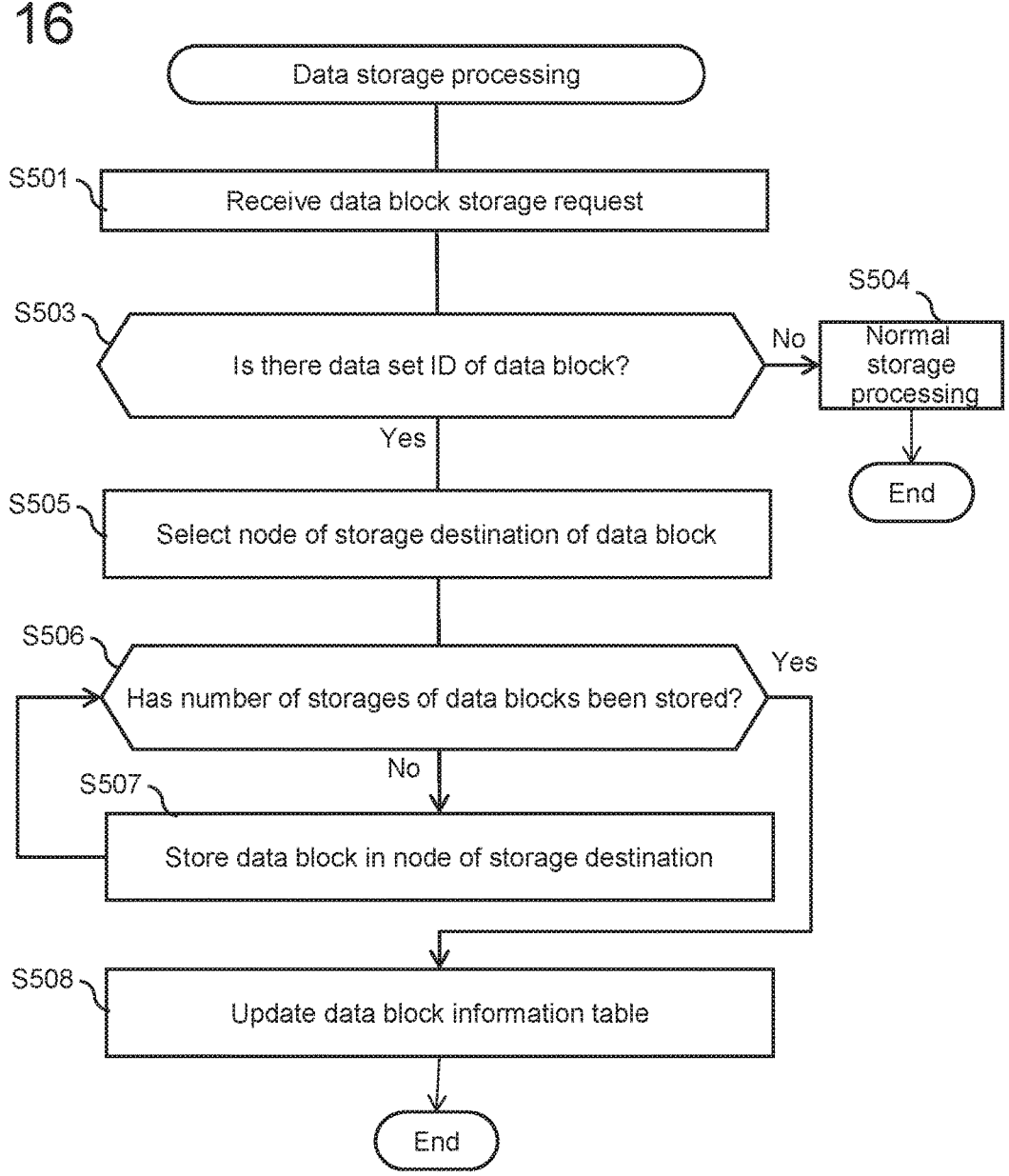
FIG. 16 is a flowchart of exemplary data storage processing.

FIG. 16 is a flowchart of exemplary data storage processing.

When receiving a request for storing the data block, the distributed file system control unit 520 performs the following processing (S501). The data block may be divided from the data set transmitted as the storage request from the client 50.

The distributed file system control unit 520 determines whether there is a data set ID corresponding to the data block to be stored in the data set information table 1000 (S503).

When there is no suitable data set ID (S503: No), the distributed file system control unit 520 performs normal processing for storing the data block (S504) and ends the processing. That is, the processing for storing a new data block is performed.

When there is the suitable data set ID (S503: Yes), the distributed file system control unit 520 selects the node of the storage destination of the data block to be stored (S505). For example, the distributed file system control unit 520 selects a node suitable for a condition (for example, condition of the primary data storage method 1050) from among the nodes configured to the data set information including the suitable data set ID in S503 (for example, nodes stored in the primary data storage node 1040).

Next, the distributed file system control unit 520 determines whether the data block to be stored is completely stored in the node 111 by the number of stored data 1550 included in the suitable data set information (S506). That is, the distributed file system control unit 520 determines whether the number of the data blocks to be stored and replica data thereof coincides with the number of stored data 1550.

When it is necessary to store additional data blocks (S506: No), the distributed file system control unit 520 stores the data blocks to be stored in the node of the storage destination (S507). The distributed file system control unit 520 may request the file system control unit 510 in the node of the storage destination to perform the processing for storing the data blocks. After the storage processing has been completed, the distributed file system control unit 520 returns to the processing in S506.

When the data blocks have been stored by the number of stored data 1550 (S506: Yes), the distributed file system control unit 520 updates the data block storage information table 1500 (S508) and ends the processing. For example, the distributed file system control unit 520 registers the storage destination of the data block with the storage place 1560.

According to the above processing, the data block to be stored and the replica data are distributed and stored in each node.

According to the present embodiment, each software and data regarding the multistage analysis processing can be appropriately arranged in each node. According to this, the load relative to the network bandwidth between the nodes can be reduced. Also, the overhead generated at the time of the data access in the above processing can be reduced.

The above-mentioned embodiment is an example to describe the present invention, and it is not intended that the scope of the present invention is limited to the embodiment. The present invention can be performed in various modes by those skilled in the art without departing from the scope of the present invention.

The orchestration control unit 570 may be performed by any node. The node for performing the orchestration control unit 570 may be determined according to a predetermined condition. A part of the plurality of nodes may include the orchestration control unit 570.

A management machine connected to at least one of the plurality of nodes may include the orchestration control unit 570. In this case, it is not necessary that all the nodes include the orchestration control unit 570. The management machine is connected to at least one of the plurality of nodes via a communication network to which the plurality of nodes is connected or another communication network.

REFERENCE SIGNS LIST

1: distribution system
110: network
111: node
121: virtual machine
200: distributed file system
700: storage apparatus

The invention claimed is:

1. A distribution system for storing a plurality of data blocks included in a plurality of files, comprising:
   a plurality of physical machines configured to be connected to a communication network, perform a plurality of virtual machines, and store the plurality of data blocks included in the plurality of files;
   a management machine configured to be connected to at least one of the plurality of physical machines,
   a storage resource configured to store processing information including a necessary resource amount, an input data, an output data and a local access value of the input data or the output data for each processing of a plurality of processings,
   a target machine, which is at least one of the plurality of physical machines and the management machine, determining a physical machine configured to arrange each virtual machine for executing each processing and a second physical machine configured to store data used in plural processings as the input data or the output data of each processing that each virtual machine executes based on the processing information such that the local access value is equal to a predefined percentage of the plurality of data blocks stored in the second physical machine by associating a first virtual machine and a second virtual machine using the processing information, wherein an output data of the first virtual machine is an input data of the second virtual machine, and, when the first virtual machine and the second virtual machine are in a same physical machine, the local access value for a respective one of the plurality of processings is equal to a predefined percentage of the plurality of data blocks in the same physical machine.

2. The distribution system according to claim 1, wherein the second physical machine is a deployment destination of the second virtual machine for performing a second processing, of a plurality of data blocks included in an output file input to the second processing that is requested by the second processing.

3. The distribution system according to claim 2, wherein when the target machine does not determine the deployment destinations of the first virtual machine and the second virtual machine and a storage destination of each data block included in the output file such that the local access value is equal to a predefined percentage of the plurality of data blocks stored in the second physical machine requested by the second processing, a replica data which is a replica of the data block included in the output file is stored in the physical machine which is the arrangement destination of the second virtual machine.

4. The distribution system according to claim 3, wherein when the local access value requested by the second processing is not satisfied in a case where equal to or larger than a predetermined number of replica data is not created, the target machine outputs an error.

5. The distribution system according to claim 2, wherein the target machine determines the physical machine which is the deployment destination of the second virtual machine from among the physical machines which provides a resource requested by the second virtual machine.

6. The distribution system according to claim 3, wherein the target machine stores equal to or larger than the predetermined number of data blocks of the plurality of data blocks included in a single file in a single physical machine.

7. The distribution system according to claim 2, wherein the target machine configures the local access value requested by the second processing to be larger than a local access value requested by a first processing.

8. The distribution system according to claim 7, wherein the first processing is batch-type processing, and the second processing is interactive processing.

9. A computer comprising:
   a storage resource configured to store management information indicating a relationship between a first processing and a second processing in a multistage processing including the first processing and the second processing having an output file output by the first processing as an input; and
   a processor configured to be connected to the storage resource,
   the computer distributing and storing a plurality of data blocks connected to a communication network and included in a plurality of files,
   the computer being one of a plurality of physical machines included in a distribution system and a management machine connected to at least one of the plurality of physical machines via the communication network or another communication network, and
   the storage resource storing processing information including a necessary resource amount, an input data, an output data and a local access value of the input data or the output data for each processing in the multistage processing,
   the processor determining a physical machine configured to arrange each virtual machine for executing each processing and a second physical machine configured to store data used in plural processings as the input data or the output data of each processing that each virtual machine executes based on the processing information such that the local access value is equal to a predefined percentage of the plurality of data blocks stored in the second physical machine by associating a first virtual machine and a second virtual machine using the processing information, wherein an output data of the first virtual machine is an input data of the second virtual machine, and, when the first virtual machine and the second virtual machine are in a same physical machine, the local access value for a respective one of the plurality of processings is equal to a predefined percentage of the plurality of data blocks in the same physical machine.

10. An arrangement method for a virtual machine, comprising:
    specifying a relationship from management information indicating the relationship between a first processing and a second processing in a multistage processing including the first processing and the second processing having an output file output by the first processing as an input; and specifying processing information including a necessary resource amount, an input data, an output data and a local access value of the input data or the output data for each processing of the multistage processing, determining a physical machine configured to arrange each virtual machine for executing each processing and a second physical machine configured to store data used in plural processings as the input data or the output data of each processing that each virtual machine executes based on the specified relationship and the processing information such that the local access value is equal to a predefined percentage of the plurality of data blocks stored in the second physical machine by associating a first virtual machine and a second virtual machine using the processing information, wherein an output data of the first virtual machine is an input data of the second virtual machine, and, when the first virtual machine and the second virtual machine are in a same physical machine, the local access value for a respective one of the plurality of processings is equal to a predefined percentage of the plurality of data blocks in the same physical machine, a plurality of data blocks connected to a communication network and included in a plurality of files being distributed and stored, and the virtual machine being arranged in the plurality of physical machines included in a distribution system.

* * * * *